(12) United States Patent
Sumant et al.

(10) Patent No.: US 11,441,097 B2
(45) Date of Patent: Sep. 13, 2022

(54) LOW FRICTION WEAR RESISTANT GRAPHENE FILMS

(71) Applicant: UCHICAGO ARGONNE, LLC, Chicago, IL (US)

(72) Inventors: Anirudha V. Sumant, Plainfield, IL (US); Ali Erdemir, Naperville, IL (US); Diana Berman, Darien, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 16/932,202

(22) Filed: Jul. 17, 2020

(65) Prior Publication Data
US 2021/0002579 A1 Jan. 7, 2021

Related U.S. Application Data

(62) Division of application No. 15/428,387, filed on Feb. 9, 2017, now Pat. No. 10,745,641.

(51) Int. Cl.
*C10M 171/06* (2006.01)
*B05D 1/02* (2006.01)
(Continued)

(52) U.S. Cl.
CPC ............. *C10M 171/06* (2013.01); *B05D 1/02* (2013.01); *C09D 1/00* (2013.01); *C10M 111/02* (2013.01); *C10M 177/00* (2013.01); *C10M 2201/041* (2013.01); *C10M 2201/0413* (2013.01); *C10M 2201/05* (2013.01); *C10M 2201/053* (2013.01); *C10M 2201/061* (2013.01); *C10M 2201/0663* (2013.01); *C10M 2201/10* (2013.01); *C10N 2020/06* (2013.01); *C10N 2030/06* (2013.01); *C10N 2040/02* (2013.01);
(Continued)

(58) Field of Classification Search
CPC ...... C10M 2201/0413; C10M 2201/05; C10M 2201/10; C10M 2201/041; C10N 2010/06; C10N 2030/06; C10N 2010/10
See application file for complete search history.

(56) References Cited

U.S. PATENT DOCUMENTS 3,638,308 A  2/1972 Fischbein et al.
3,774,703 A  11/1973 Sanderson
(Continued)

FOREIGN PATENT DOCUMENTS

CN  102627993 A  8/2012
CN  106398802 A  2/2017
(Continued)

OTHER PUBLICATIONS

Berman, et al., "Macroscale superlubricity enabled by graphene nanoscroll formation," Science 348(6239), pp. 1118-1122 (2015).
(Continued)

*Primary Examiner* — Vishal V Vasisth
(74) *Attorney, Agent, or Firm* — Foley & Lardner LLP

(57) ABSTRACT

A low friction wear surface with a coefficient of friction in the superlubric regime including graphene and nanoparticles on the wear surface is provided, and methods of producing the low friction wear surface are also provided. A long lifetime wear-resistant surface including graphene exposed to hydrogen is provided, including methods of increasing the lifetime of graphene containing wear surfaces by providing hydrogen to the wear surface.

5 Claims, 14 Drawing Sheets

(51) Int. Cl.
| | |
|---|---|
| *C09D 1/00* | (2006.01) |
| *C10M 111/02* | (2006.01) |
| *C10M 177/00* | (2006.01) |
| *C10N 20/06* | (2006.01) |
| *C10N 30/06* | (2006.01) |
| *C10N 40/02* | (2006.01) |
| *C10N 40/14* | (2006.01) |
| *C10N 40/18* | (2006.01) |
| *C10N 40/30* | (2006.01) |
| *C10N 40/36* | (2006.01) |
| *C10N 40/20* | (2006.01) |
| *C10N 50/02* | (2006.01) |
| *C10N 70/00* | (2006.01) |

(52) U.S. Cl.
CPC ...... *C10N 2040/17* (2020.05); *C10N 2040/18* (2013.01); *C10N 2040/242* (2020.05); *C10N 2040/30* (2013.01); *C10N 2040/36* (2013.01); *C10N 2050/02* (2013.01); *C10N 2070/00* (2013.01)

(56) References Cited

U.S. PATENT DOCUMENTS

| | | | |
|---|---|---|---|
| 5,462,362 | A | 10/1995 | Yuhta et al. |
| 5,922,418 | A | 7/1999 | Koike et al. |
| 6,273,973 | B1 | 8/2001 | Parayil et al. |
| 2006/0172897 | A1 | 8/2006 | Yamamoto |
| 2007/0158609 | A1 | 7/2007 | Hong et al. |
| 2008/0116011 | A1 | 5/2008 | Takahama et al. |
| 2008/0302998 | A1 | 12/2008 | Hong et al. |
| 2009/0033164 | A1 | 2/2009 | Khan |
| 2010/0011826 | A1 | 1/2010 | Buehler et al. |
| 2010/0087346 | A1 | 4/2010 | Giesler et al. |
| 2010/0173134 | A1 | 7/2010 | Khokhlov et al. |
| 2011/0046027 | A1 | 2/2011 | Zhamu et al. |
| 2012/0115761 | A1 | 5/2012 | Basu |
| 2012/0118255 | A1 | 5/2012 | Jung et al. |
| 2012/0122743 | A1 | 5/2012 | Ivanov et al. |
| 2012/0204429 | A1 | 8/2012 | Vlachos et al. |
| 2013/0015409 | A1 | 1/2013 | Fugetsu |
| 2013/0115462 | A1 | 5/2013 | Mazyar et al. |
| 2013/0126865 | A1 | 5/2013 | Chiang et al. |
| 2013/0190449 | A1 | 7/2013 | Kinloch et al. |
| 2013/0324447 | A1 | 12/2013 | Tsou et al. |
| 2014/0291819 | A1 | 10/2014 | Barth |
| 2015/0197701 | A1 | 7/2015 | Sumant et al. |
| 2015/0367381 | A1 | 12/2015 | Sumant et al. |
| 2016/0325994 | A1 | 11/2016 | Qu et al. |
| 2018/0229384 | A1 | 8/2018 | Chadwick et al. |
| 2018/0251641 | A1 | 9/2018 | Vasileiou et al. |

FOREIGN PATENT DOCUMENTS

| | | |
|---|---|---|
| CN | 108251195 A | 7/2018 |
| RU | 2310777 C2 | 11/2007 |
| WO | WO-2010/125059 A1 | 11/2010 |
| WO | WO-2011/081538 A1 | 7/2011 |
| WO | WO-2012/046069 A1 | 4/2012 |

OTHER PUBLICATIONS

Buckley, "Friction, wear, and lubrication in vacuum," NASA Technical Report No. NASA-SP-277, 190 pages (1971).
Cummings & Zettl, "Low-Friction Nanoscale Linear Bearing Realized from Multiwall Carbon Nanotubes," Science 289(5479), pp. 602-604 (2000).
Dienwiebel, et al., "Superlubricity of Graphite," Physical Review Letters 92(12), 126101, 4 pages (2004).
Erdemir, et al., "Synthesis and Tribology of Carbide-Derived Carbon Films," International Journal of Applied Ceramic Technology 3(3), pp. 236-244 (2006).
Fundus & Knock, "Diamond Like Carbon Coatings—Tribological Possibilities And Limitations In Applications On Sintered Silicon Carbide Bearing And Seal Faces," Proceedings of the 14th International Pump Users Symposium, pp. 93-98 (1997).
Hare & Burris, "The Effects of Environmental Water and Oxygen on the Temperature-Dependent Friction of Sputtered Molybdenum Disulfide," Tribology Letters 52(3), pp. 485-493 (2013).
International Search Report & Written Opinion for PCT/US20013/051121 dated Nov. 14, 2013, 8 pages.
Kim, et al., "Chemical Vapor Deposition-Grown Graphene: The Thinnest Solid Lubricant," ACS Nano 5(6), pp. 5107-5114 (2011).
Kim, et al., "Chemical Vapor Deposition-Grown Graphene: The Thinnest Solid Lubricant," ACS Nano 5, pp. 5107-5114 (2014).
Lee, et al., "Frictional Characteristics of Atomically Thin Sheets," Science 328(5974), pp. 76-80, (2010).
Liu, Z., et al., "Observation of Microscale Superlubricity in Graphite", Physical Review Letters, May 18, 2012, 108:205503-1-205503-5.
Novoselov, et al., "Electric Field Effect in Atomically Thin Carbon Films," Science 306(5696), pp. 666-669 (2004).
Podgornik, et al., "Tribological behaviour and lubrication performance of hexagonal boron nitride (h-BN) as a replacement for graphite in aluminium forming," Tibology International 81, pp. 267-275 (2015).
Singhbabu, et al., "Efficient anti-corrosive coating of cold-rolled steel in a seawater environment using an oil-based graphene oxide ink," Nanoscale 7(17), pp. 8035-8047 (2015).
Stankovich, et al., "Synthesis of graphene-based nanosheets via chemical reduction of exfoliated graphite oxide," Carbon 45(7), pp. 1558-1565 (2007).
Sumant, et al., "Ultrananocrystalline Diamond Film as a Wear-Resistant and Protective Coating for Mechanical Seal Applications," Tribology Transactions 48(1), pp. 24-31 (2005).
Wu, et al., "Experimental analysis of tribological properties of lubricating oils with nanoparticle additives," Wear 262(7-8), pp. 819-825 (2007).
Yu, et al., "Graphene segregated on Ni surfaces and transferred to insulators," Applied Physics Letters 93, 113103, 4 pages (2008).
Babuska, et al., "Understanding Friction in MoS2: Part 1: Stress, Time and Temperature," 63rd AVS Symposium, SAND2017-5129C, 15 pages (2017).

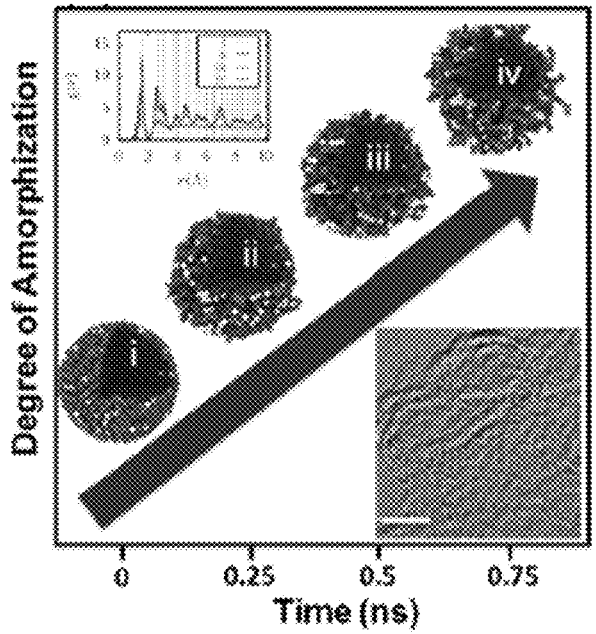 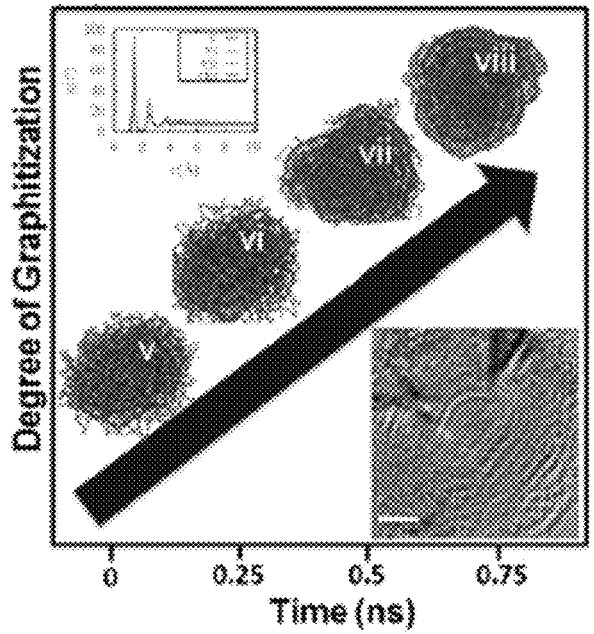
FIG. 5A  FIG. 5B
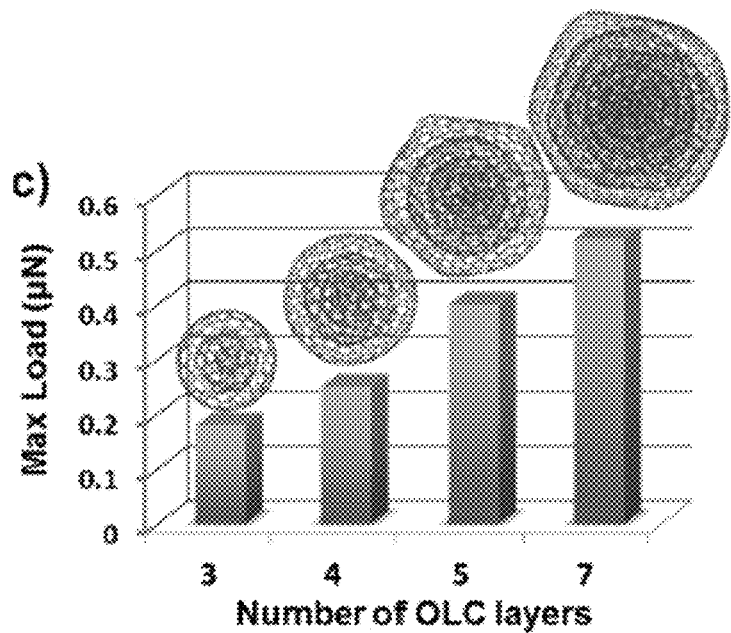
FIG. 5C

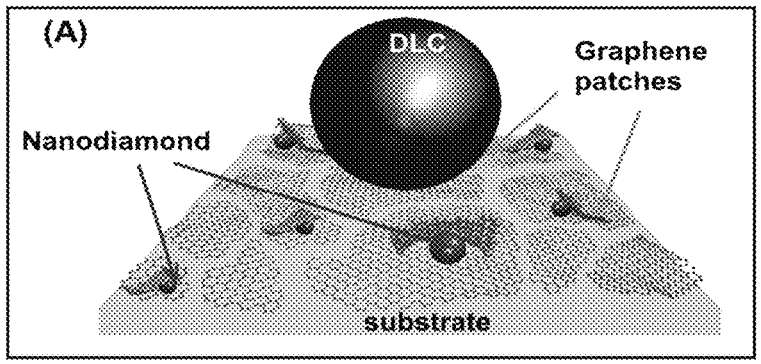
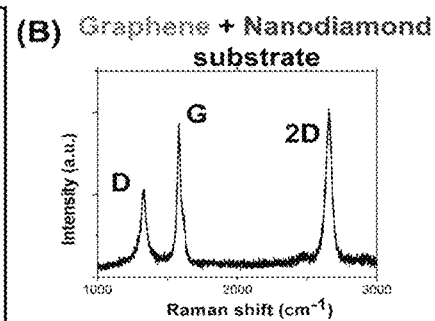
FIG. 9A  FIG. 9B
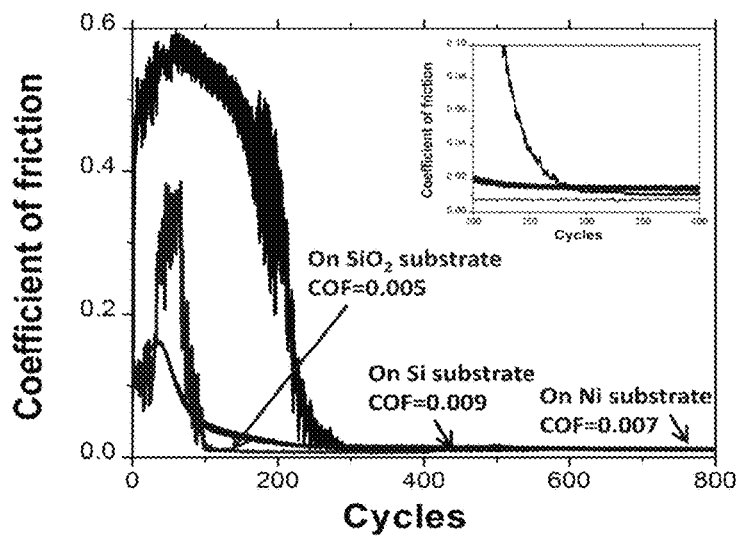
FIG. 9C

| Diamond | | Graphene | | | | | |
|---|---|---|---|---|---|---|---|
| | <0.25 µg | 0.25 µg | 0.5 µg | 1 µg | 2 µg | 5 µg | 10 µg | >10 µg |
| <12.5 µg | | | | | | | | |
| 12.5 µg | | 50:1 | | | | | | |
| 25 µg | | 100:1 | 50:1 | 25:1 | 12.5:1 | 5:1 | 2.5:1 | |
| 50 µg | | 200:1 | 100:1 | 50:1 | 25:1 | 10:1 | 5:1 | |
| 100 lg | | 500:1 | 200:1 | 100:1 | 50:1 | 20:1 | 10:1 | |
| 250 µg | | 1000:1 | 500:1 | 250:1 | 125:1 | 50:1 | 25:1 | |
| 500 µg | | 2000:1 | 1000:1 | 500:1 | 250:1 | 100:1 | 50:1 | |
| 1000 µg | | 4000:1 | 2000:1 | 1000:1 | 500:1 | 200:1 | 100:1 | |
| 2000 µg | | 10000:1 | 4000:1 | 2000:1 | 1000:1 | 400:1 | 200:1 | |
| 5000 µg | | 20000:1 | 10000:1 | 5000:1 | 2500:1 | 1000:1 | 500:1 | |
| 10000 µg | | 40000:1 | 20000:1 | 10000:1 | 5000:1 | 2000:1 | 1000:1 | |
| >10000 µg | | | | | | | | |

LOW FRICTION WEAR RESISTANT GRAPHENE FILMS

CROSS-REFERENCE TO RELATED APPLICATIONS

This application is a DIV of Ser. No. 15/428,387 filed Feb. 9, 2017, now patent Ser. No. 10/745,641.

STATEMENT REGARDING FEDERALLY SPONSORED RESEARCH

This invention was made with government support under Contract No. DE-AC02-06CH11357 awarded by the U.S. Department of Energy, Office of Science, Office of Basic Energy. The United States government has certain rights in this invention.

BACKGROUND

Understanding and controlling the root causes of friction have long been a tireless pursuit of mankind mainly because friction impacts our safety, mobility, and environment in so many ways. Accordingly, those scientists who study friction across many scales and engineers who design, manufacture, and operate moving mechanical assemblies (MMAs), like motored vehicles, have all aimed at drastically reducing or even totally vanishing friction or achieving superlubricity at engineering scales. The superlubric regime is attractive because it would provide the highest levels of savings in energy, environment, and money. Despite the development and use of many kinds of solid and liquid lubricants in recent years, superlubricity is seldom achieved at macro or engineering scales. Generally, friction coefficients of less than 0.01 are considered superlow, and hence fall in the superlubric regime. Such levels of friction coefficients are typical of those surfaces that are either aero- or hydro-dynamically separated or magnetically levitated where little or no solid-to-solid contact takes place. Under sliding regimes where direct metal-to-metal contacts prevail and high contact pressures are present, achieving superlubric friction coefficients (i.e., less than 0.01) is difficult due to the concurrent and often very complex physical, chemical, and mechanical interactions taking place at sliding surfaces.

In theory, computer simulations, and nano-scale experiments, the feasibility of superlubricity for certain atomically smooth crystalline solids that are in dry and incommensurate sliding contacts has been demonstrated. This effect, also called structural lubricity, was theoretically predicted in 1991 and later verified experimentally between two atomically smooth sliding surfaces of single crystal silicon and graphite materials. Recently, similar observations were made between the interwalls of two nested multiwalled carbon nanotubes. To enable superlubricity, atoms in these materials are oriented in a special manner and form an atomic hill-and-valley landscape, which looks like an egg-crate. When the two graphite surfaces are in registry (every 60 degrees), the friction force is high but when the two surfaces are rotated out of registry, the friction is nearly eliminated. By way of illustration, this effect is like two egg-crates which can slide over each other more easily when they are "twisted" with respect to each other. Since this effect is due to the incommensurability of lattice planes sliding against each other, the effect is restricted to material interactions at the nanoscales. At macro-scale, this structural effect, and hence superlubricity, is lost due to the structural imperfections and disorder caused by many defects. Superlubricity is very difficult to achieve at macro-scale tribological tests and mechanical systems.

SUMMARY

One embodiment relates to a method of forming a low friction wear surface. The method comprises disposing over a substrate a solution comprising nanodiamonds and a 2D material selected from the group consisting of $MoS_2$ and h-BN to form a first sliding component. The first sliding component is slid against a second sliding component having a diamond-like carbon on a sliding surface. Scrolls of the material are formed around the nanodiamonds. The scrolled nanodiamonds are formed into nano-onions.

One embodiment relates a method of forming a low friction wear surface. The method comprises preparing graphene by chemical exfoliation of highly oriented pyrolytic graphite, suspending the graphene in a solvent to form a solution of at least 1 mg/L, adding 50-1000 mg/L of nanodiamonds to the graphene solution, and forming solution processed graphene with nanodiamonds by depositing the solution on a substrate in a dry, inert environment and evaporating the solvent.

One embodiment relates to a low friction wear surface. The low friction wear surface comprises a substrate and graphene disposed over the substrate Nanoparticles are disposed over the substrate, the nanoparticles selected from the group consisting of diamond, Ni, Fe, Pt, Co, $Si_3N_4$ and combinations thereof. The nanoparticles are free from oxidation.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A shows schematics depicting the mechanism of OLC formation: (I) dispersion of $MoS_2$ and nanodiamonds on the surface, (II) wrapping of $MoS_2$ sheets around nanodiamonds, (III) partial disintegration of $MoS_2$ and amorphization of nanodiamond, and (IV) formation of OLCs. FIG. 2B shows electron energy loss spectra highlighting the calculated fraction of sp2-bonded carbon and tracking full transformation from (I) nanodiamonds into (IV) OLC structures. FIGS. 2C-2F show TEM images of the wear debris taken at regular intervals after interrupting the tribotest and corresponding to four stages (I-IV) of transformation. FIG. 2C indicates good dispersion of $MoS_2$ sheets along with nanodiamonds; FIG. 2D, initial breaking of $MoS_2$ layers and wrapping around nanodiamonds; FIG. 2E, further wrapping of the $MoS_2$ layers around the nanoparticles and reduction in the size of nanodiamonds due to the catalytic reaction leading to amorphization and precipitation of amorphous carbon; and FIG. 2F, complete transformation into OLCs in the wear track with no indication of $MoS_2$ layers inside the wear track. The presence of the initial mixture of diamond and $MoS_2$ and the OLC structures is indicated by interlayer spacing in the diamond lattice, as well as between $MoS_2$ and graphitic layers.

FIG. 5A shows atomic snapshots at selected times during the sulfur-induced amorphization of a diamond nanoparticle. FIG. 5B shows atomic snapshots at selected times during the formation of OLC structures from amorphous carbon. Insets in FIG. 5A and FIG. 5B indicate the radial distribution functions for each step highlighted and the corresponding TEM image of the resulting structure. The scale bar in TEM images is 5 nm. FIG. 5C shows simulation results showing dependence of fracture loads on number of layers in the carbon onions, indicating increased load-bearing stability of OLC with increase in OLC layers.

FIG. 8A initial nickel substrate; FIG. 8B after deposition of graphene-ND solution, where darker grey areas represent graphene flakes and bright spots represent diamond nanoparticles.

FIGS. 9A-9C show: FIG. 9A Experimental setup schematic; FIG. 9B shows Raman signature of the substrate surface after deposition GND solution; and FIG. 9C shows examples of achieving superlubricity regime when the graphene-ND solution is deposited on different substrates are shown: for silicon dioxide the resulting COF=0.005, for polycrystalline nickel film the resulting COF=0.007, for bare silicon substrate the resulting COF=0.009.

FIG. 15 shows experimental observations regarding the amount of graphene and nanodiamond needed per 10 $cm^2$, and the corresponding mixture rate of graphene and nanodiamond, showing successful achieving of the superlubricity state.

DETAILED DESCRIPTION

Following below are more detailed descriptions of various concepts related to, and embodiments of, inventive low friction and wear resistant graphene containing surfaces. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Generally speaking, the various embodiments described herein include a low friction wear surface including a 2-d material and, optionally in some embodiments, nanoparticles. The wear surface may exhibit superlubricity, in one embodiment, through tribological interaction between surfaces or, in another embodiment, through a tribocatatolytic reaction product.

The 2-d material and nanoparticles may be produced by any appropriate process. According to one embodiment, the process may include disposing graphene over a substrate and disposing nanoparticles over the substrate. The process may be carried out at atmospheric pressures and temperatures.

The disposing of the 2-d material over the substrate may be achieved by any suitable process, such as a solution processed method.

Figure 1A:
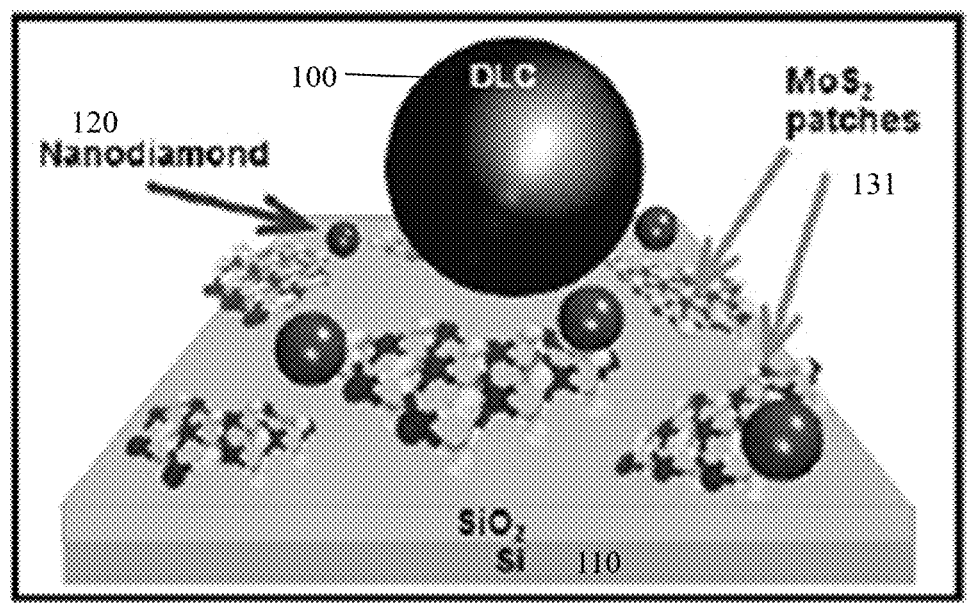
FIG. 1A is a schematic depiction of a wear resistance and coefficient of friction testing arrangement in one embodiment.

Superlubricity may be defined as a regime of motion in which friction vanishes or nearly vanishes, such as a COF of less than about 0.01. The superlubric friction is measured by sliding the 2-d material against a ball with a DLC surface. A ball with a DLC surface 100 is shown in FIG. 1A. As shown in FIGS. 2A-2F (for $MoS_2$) and FIGS. 6A-6C (for BN) the surface producing superlubric friction against a ball with a DLC surface 100 may include a substrate layer 110, 2-d material patches 130, 131, 132 and nanoparticles 120 disposed over the substrate. A 2-d material layer may be disposed between the substrate and the 2-d material patches 130.

The solution processed materials may be obtained by exfoliating graphene and disposing the resulting graphene flakes in a liquid. The graphene may be exfoliated by any appropriate chemical or mechanical exfoliation process, such as chemical exfoliation of highly oriented pyrolytic graphite in the case of graphene. The liquid may be any compatible liquid, such as water, alcohol or a hydrocarbon based solvent. The solution processed materials may be disposed over the substrate by spraying the solution containing the 2-d material flakes on the substrate and evaporating the liquid.

Solution processed materials thus refers to materials, such as graphene, that have been disposed on a surface by evaporating a solution. Notably, solution processed materials differ from those remaining in solution (such as graphene suspended in oil) or those applied chemically. For example, those materials in solution are, obviously, in solution and not bound to the substrate surface. In contrast, solid materials that have been deposited as solution processed graphene will not be in solution, rather such materials will be controlled by Van der Waals forces to attach the materials to the substrate. Further, there is also a structural difference between such solution processed materials and those formed as a solid on the surface of the substrate by chemical vapor deposition, atomic layer deposition, or the like. In such instances, the material is reacted (covalently bonded) with or chemisorbed to the substrate rather than merely held by Van der Waals forces. Further, for more than mono layer, the additional layers are also bound, whereas the solution processed materials experience weaker Van der Waals forces, enabling the sloughing of outer layers and the improved lubricity.

Solution processed materials differ from those remaining in solution or those applied chemically. For example, Singhbabu et al., in Nanoscale, 2015, 7:8035-8047, demonstrated Raman spectroscopy (in their FIG. 6) results of mixed graphene oxide with oil (referred to as "ink") and compared with solid graphene oxide and just oil. From this it is very clear that the chemical phase of the ink (graphene oxide+oil) is basically a combination of oil and graphene oxide and NOT graphene oxide in its solid form. The properties of this ink are different than graphene oxide alone. In a similar way, graphene mixed in oil behaves very differently than graphene in its solid form. Please note that those materials in solution are, obviously, in solution and not bound to the substrate surface. In contrast, solid graphene that has been deposited as solution processed graphene will not be in solution. Thus, chemically deposited graphene such as by CVD, where the graphene is reacted with the substrate, or suspended-in-liquid graphene, both would be understood to demonstrate different physical and chemical properties from a graphene that is deposited by solution processing.

The nanoparticles may be formed of any suitable material. The nanoparticles may be any suitable size. According to one embodiment, the nanoparticles may have a size of about 2 nm to about 10 nm, such as about 3 to about 5 nm. The size of the nanoparticles may refer to a diameter of the nanoparticles. The disposing of the nanoparticles may be achieved by any suitable process. According to one embodiment, the nanoparticles may be disposed in a compatible liquid, such as water, alcohol or a hydrocarbon-based solvent. The nanoparticles in liquid may be sprayed on the substrate and the liquid evaporated to dispose the nanoparticles over the substrate. The nanoparticles may be included in the same liquid as the 2-d material, and disposed over the substrate at the same time as the 2-d material. Alternatively, the nanoparticles may be disposed over the substrate before or after the 2-d material. The nanoparticles may also be disposed over the substrate by contacting dry nanoparticles with the surface of the substrate. The nanoparticles may be uniformly distributed over the surface. According to one embodiment, the nanoparticles may be generated on the surface from the substrate during the initial sliding regime.

The 2-d materials may be introduced onto the surface by spraying a 2-d materials-containing solution (with a solvent such as ethanol) over the surface and then evaporating the solvent. Therefore, no chemical vapor deposition (CVD) or other types of preparation steps are required and the graphene application procedures are simple and may be adopted easily for practical applications. For example, the simple procedure may be used to lubricate silicon-based MEMS.

The material layer 130 may be disposed over a substrate 110. The substrate may be any suitable material. According to one embodiment, the substrate may include at least one of a metal, a transition metal and an insulator. The substrate may be silicon, $SiO_2$ or silicon with a $SiO_2$ surface layer. The substrate may include a surface film including a metal, such as nickel. According to another embodiment, the substrate may include at least one of silicon nitride, aluminum oxide, and sapphire.

The 2-d materials may be present on the substrate in a discontinuous layer. The 2-d material may have any appropriate density over the surface of the substrate. According to one embodiment, the density of the nanoparticles may be less than the density of the 2-d material patches present on the surface of the substrate. The 2-d material may cover at least about 25% of the substrate surface.

Superlubric Graphene-Nanodiamond Systems.

Some embodiments relate to superlubricity achieved on a variety of substrates, including most industrially relevant substrate materials such as stainless steel, using a combination of premixed nanodiamond and graphene flakes in an ethanol solution. In some embodiments, the graphene flakes and nanodiamonds are premixed in the solution form and could be transferred (sprayed) on any given solid surface (once they are synthesized) at atmospheric pressures and temperatures and can be easily scalable to a large area. The premixed solution (in alcohol) could be sprayed over the surface of interest and once the alcohol is vaporized, the graphene and nanodiamond are bound to the surface by Van der Waals attractive forces, which could be much stronger due to the 2D nature of the graphene flakes. A large scale application of such may be to utilize a scanning spray nozzle to cover a large area with the graphene in solution and then vaporize the solvent.

Currently, there is no other graphene-based technology that can provide such a low friction (i.e., less than 0.01) under conditions that are most suited for many commercial applications. The sprayed graphene or graphene-nanodiamond mixture is characteristically different than CVD grown graphene since graphene can only grow by CVD process on selective substrates such as Cu, Ni and SiC at high temperature (1000-1400 C). The graphene deposited by CVD process is chemically bonded to the underlying substrate and it takes a much longer time to grow multilayer graphene (reference Das et al., Carbon, 2013, 59:121-129). The graphene-nanodiamond mixture is a special case in particular since that cannot be deposited by any other method, for example CVD where only graphene would be deposited by typical techniques, and the properties of such composite are very different than the graphene itself (physical, chemical properties)

Solution-processed graphene (SPG) was prepared by chemical exfoliation of highly oriented pyrolytic graphite (HOPG) and was then suspended in ethanol where the weight concentration of graphene was I mg/L, containing mostly single-layer graphene. Such a low concentration of graphene was chosen to prevent the agglomeration of pristine graphene sheets. Afterwards, diamond nanoparticles (nanodiamonds) of 3-50 nm diameter were added into the solution in the proportion of 50-1000 mg of nanodiamonds per 1 L of solution (as one preferred range). The resulting solution was sonicated at the sonicator bath for 10-30 minutes to ensure good dispersion of graphene and nanodiamond in ethanol.

Thus, in one embodiment:

SPG is prepared by chemical exfoliation of highly oriented pyrolytic graphite ("HOPG"), which is then suspended in an alcohol, such as ethanol/acetone/isopropyl alcohol/methanol to achieve 50 mg/L to 1000 mg/L, most preferably 1 mg/L with 3-50 nm nanodiamonds then added to the SPG solution (50-1000 mg/L) in specific ratio. The desired range of nanodiamond to graphene ratio is 50:1 to 1000:1.

The resulting solution is sonicated for 10-30 min.

The solution is deposited, such as drop-casted or sprayed, on the surface and evaporated in dry inert, such as nitrogen or argon.

The solution processed materials have coverage amount ranges from 0.25 mL-10 mL per 10 $cm^2$.

FIG. 15 summarizes experimental observations regarding the amount of graphene and nanodiamond needed per 10 $cm^2$, and the corresponding mixture rate of graphene and nanodiamond, showing successful achieving of the superlubricity state.

Figure 8:
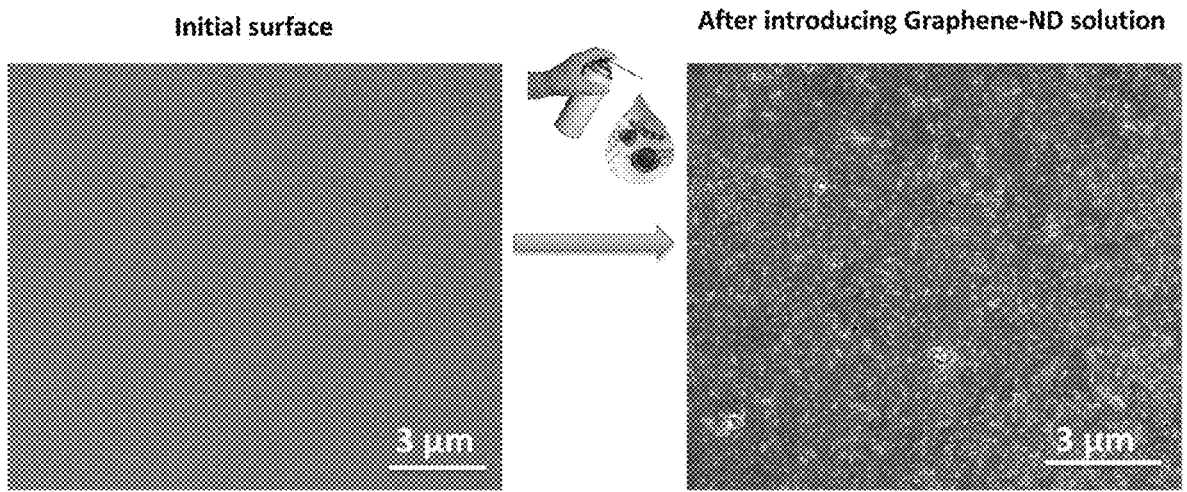
FIGS. 8A-8B show SEM images highlighting the graphene+nanodiamond deposition procedure performed on nickel sample.

FIG. 15 outlines the weight amount of nanodiamond and graphene needed per 10 $cm^2$. Bold cells highlight the useful amount for demonstrating the superlubricity regime, while italicized and bolded cells demonstrate the commonly used amounts of graphene and nanodiamond, for which the deposition procedure results in ~75% of the surface coverage and works the best. In all the cases the original concentration of graphene in ethanol is 1 mg/L before adding nanodiamonds. Usually, a small amount of graphene-nanodiamond (GND) solution (10-20 drops or 0.5-1 mL of solution per 10 $cm^2$) was applied on the substrate material 1 in a colloidal liquid state, and the liquid ethanol part was evaporated in dry nitrogen to reduce graphene oxidation. In this case, the procedure resulted in few-layer (3-4 layers) graphene flakes (~75% of the surface coverage) with nanodiamonds non-uniformly covering the substrate with the estimated size of the deposited graphene sheets within the range of 0.5-2 µm. The expected number density of nanodiamonds per unit area of the substrate comes down to 1011-1013 particles/$cm^2$ depending on the size of nanodiamond (3-5 nm). However, the amount of the used solution may be modified to the range 5-200 drops, or 0.25-10 ml of solution per 10 $cm^2$, and the resulting coating on the substrate still demonstrates superlubric friction. FIGS. 8A-8B outline the steps of the graphene+nanodiamond deposition procedure and shows the resulting graphene-nanodiamond film coverage for the solution (nanodiamond: graphene weight concentration is 100:1) via Scanning Electron Microscopy (SEM) images.

In the experimental data shown below (FIGS. 9A-9C) three different substrate materials were used to demonstrate the successful achievement of super low friction when GND solution is sprayed on the surface and dried before sliding against a DLC coated ball in a dry environment (nitrogen or argon): silicon, silicon dioxide, stainless steel and nickel.

It should be appreciated that the roughness of the underlying substrate may impact the graphene and nanoparticle system interaction. In the cases described in FIG. 15, the roughness of the substrate materials was smaller than the used size of the nanoparticles (3-5 nm). In case of rougher (i.e., having a surface roughness of 7-10 nm) underlying substrate, such as for example stainless steel (rms roughness of 20 nm) the modified solution is prepared with nanodiamond in the form of agglomerates with up to 50 nm aggregated size. In general, the nanoparticle size should be larger than the average roughness of the underlying substrate. However, where the nanaoparticle is diamond, the particle size is preferred to be below 100 nm so as to avoid formation of facets. In a preferred embodiment the nanoparticle is spherical or substantially spherical without faceting.

Figure 10:
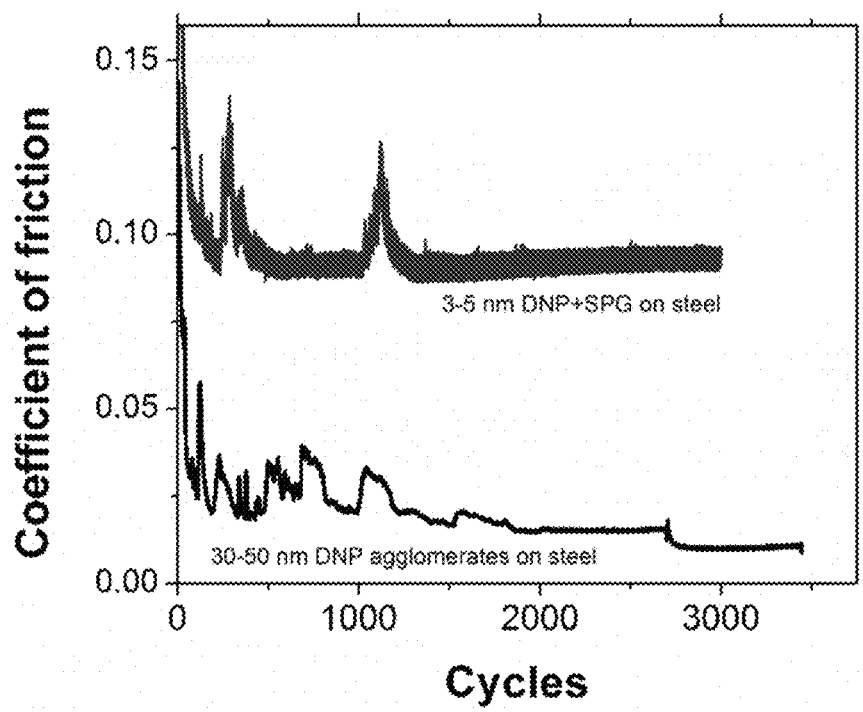
FIG. 10 shows coefficients of friction for two different types of solution (with small 3-5 nm nanodiamonds and with large 30-50 nm nanodiamond agglomerates) deposited on the rough stainless steel surface. The figure shows that the size of the nanodiamonds should exceed the roughness of the substrate material to establish the superlubricity regime.

In the case of the rough steel substrate, the initial running period for the COF to reach superlubricity regime is long, which is attributed to longer scroll formation and rearrangement timing. FIG. 10 demonstrates the necessity of using large diamond agglomerates in case of stainless steel substrate for achieving the superlubricity. In this case the composition of the materials (1 mg of graphene and 50-250 mg of nanodiamond per 1 L of ethanol s solution) remains the same. All other conditions of the experimental setup remain the same (substrate with deposited graphene+nanodiamond solution slides against diamond like carbon ball under dry environment conditions). For some embodiments with rough substrates, the size of the nanodiamond particle needs to be on the order of the surface roughness to achieve superlubricity.

Superlubric Tribocatalytic Systems.

Molybdenum Disulfide ($MoS_2$) or Hexagonal Boron Nitride (h-BN) Tribocatalytic Materials.

Graphene has previously been described in U.S. patent application Ser. No. 14/309,366, incorporated by reference here, as a 2-d material that achieves superlubricity. Some embodiments herein relate to 2-d catalytic materials that achieve superlubricity. Some embodiments relate to 2-d materials that include materials catalytic to reaction with diamond materials, including molybdenum disulfide ($MoS_2$) or hexagonal boron nitride (h-BN), thus expanding the superlubricity effect to other 2-d materials as well.

It has been discovered that certain embodiments herein exhibit near zero friction, i.e superlubric or a COF below 0.01, between $MoS_2$ film coupled with diamond nanoparticles (3-100 nm), when sliding against diamond-like carbon film in nitrogen atmosphere. It has been observed that beyond some initial run-in period, the friction comes down to some un-measurable levels (below 0.008) and remains there for a very long period of time (10,000 cycles), despite the fact that $MoS_2$ film is only a few nanometers thick.

In one embodiment, superlubricity is achieved at macro scales, regardless of the incommensurability and under more industrially relevant sliding conditions. Some embodiments relate to a new mechanism of carbon nano-onions formation in the sliding interfaces, which enables achieving the superlubricity state in case of $MoS_2$ coupled with nanodiamonds. Carbon nano-onions are considered 0-d materials, with small diameter (under 10 nm). Carbon nano-onions (or onion-like carbon) have spherical structure with graphene layers ranging from 2-3 to 100 or more. As the number of layers increases, its mechanical strength increases almost linearly. Typically, 25-40 layers can withstand contact pressures on the order of 0.5-1.2 GPa. The mechanism for carbon nano-onions formation in sliding diamond catalytic 2d materials (for example $MoS_2$ and HN) and nanodiamonds against DLC interfaces is shown to be as follows:

- Solution-processed material ($MoS_2$ or h-BN) was prepared by mechanical exfoliation and was then suspended in an alcohol (ethanol) with the weight concentration of 18 mg/L, containing mostly 1-8 layers of $MoS_2$ or h-BN materials.
- Diamond nanoparticles (nanodiamonds) of 3-50 nm diameter into the solution in the proportion of 50-1000 mg of nanodiamonds per 1 L of solution. The resulting solution was sonicated at the sonicator bath for 20-30 minutes to ensure good dispersion of material and nanodiamond in ethanol.
- Nanodiamond solution and $MoS_2$ (or h-BN) solution which are prepared in different concentration was then mixed together and sonicated for 20-30 mins and then sprayed or drop casted on a substrate.
- $MoS_2$ (or h-BN) patches between the sliding interfaces start to form the scrolls around nanodiamond particles and in case of $MoS_2$, due to high contact pressure, gets disintegrated in to Mo and $S_2$. The sulfur then reacts with nanodiamond, graphitizing it entirely and, thus, forming carbon nano-onions. All the nanodiamonds get converted into carbon nano-onions. It is believed that after about 20-30 cycles (for example, under one minute), the concentration of scrolls formed results in a superlubric behavior.
- Once the nanodiamonds are fully converted into carbon nano-onions, they slide against DLC surface, thus reducing the contact area and resulting in dramatically decreased friction. The environment for this is, in one embodiment, a dry environment (such as 30% humidity or less, 20% or less, 10% or less) and may be in an argon, nitrogen, or other inert gas environment.
- Due to the high number of the graphitic layers in the formed carbon nano-onions, the stiffness of them is high to survive under high contact pressures. We have observed the number of graphitic layers in carbon onions was in the range of 25-40. Carbon onions with graphitic layers less than 10 did not show superlubricity since they must get buckled due to the high contact pressures, thus increasing the contact area.

$MoS_2$ Tribocatalytic Material.

Figure 1B:
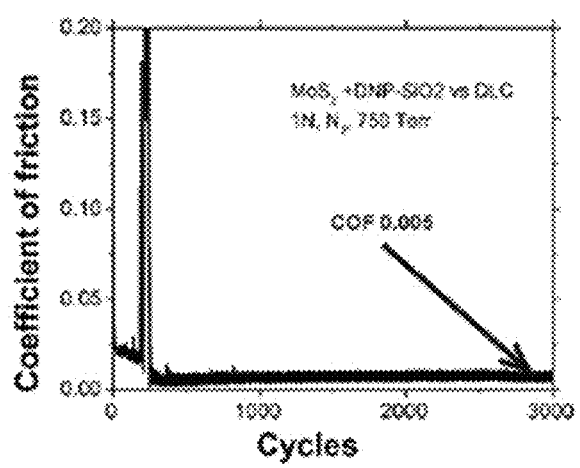
FIG. 1B shows observed near zero coefficient of friction (COF), reaching as low as 0.005.
Figure 1C:
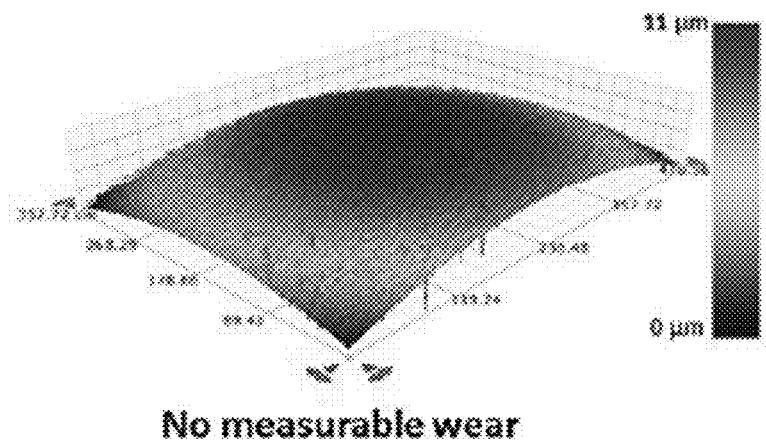
FIG. 1C shows negligible wear on the ball.
Figure 1D:
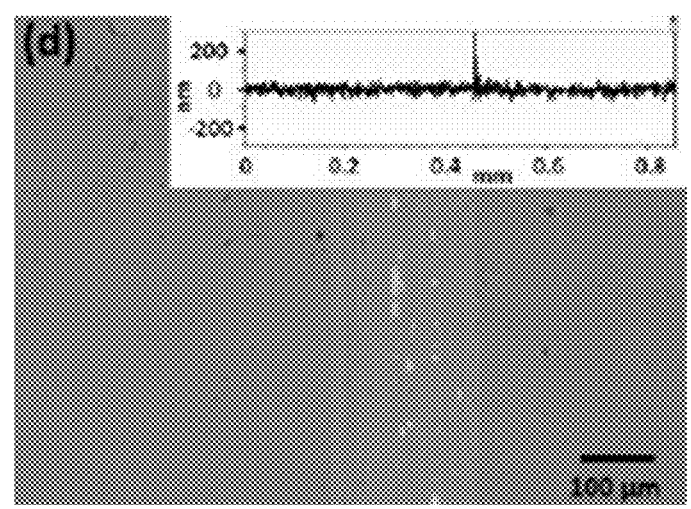
FIG. 1D shows wear on the flat surface.

FIG. 1A demonstrates the configuration of the tribosystem tested and highlights the observed near zero coefficient of friction (COF), reaching as low as 0.005 (FIG. 1B) with negligible wear on the ball (FIG. 1C) and flat surface (FIG. 1D). The flat mark observed on the ball side is associated with contact pressure-induced deformation (the Hertz contact diameter is approximately 86 μm) and is not due to the wear. Material buildup on the flat side is associated with the formation of onion-like carbons ("OLCs") inside the wear track.

Figure 2A:
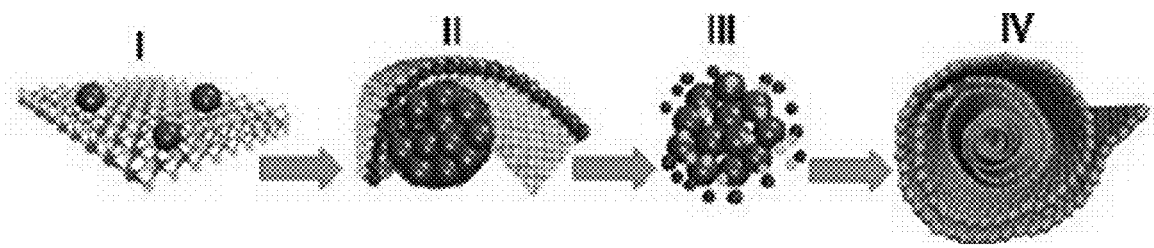
FIGS. 2A-2F demonstrate.

As described herein, one embodiment relates to a new catalytically driven mechanism of superlubricity when OLCs form in the tribolayer from a mixture of $MoS_2$ with nanodiamonds at sliding interfaces as shown in the schematics in FIG. 2A, leading to decreased friction values from high values down to near zero. The evolution of $MoS_2$ and nanodiamonds leading to formation of OLC structures while sliding against H-DLC interfaces occurs via the following pathway: $MoS_2$ patches with high elastic bending modulus (by a factor of 7 higher than for graphene) between the sliding interfaces start to form scrolls around small clusters of nanodiamonds, as shown in FIG. 2A (I-II). This condition is more clear from the transmission electron microscopy (TEM) images taken on the wear debris collected from the wear track after specific wear cycles, as shown in FIGS. 2C-2F. As the sliding proceeds, due to the high contact pressure (~0.2 GPa), $MoS_2$ starts to disintegrate into molybdenum and sulfur, and due to the high affinity of sulfur toward oxygen, it bonds to the oxygenated nanodiamond surface. The nanodiamonds produced from this detonation process are known to have carboxyl and oxygenated species on the surface. The diffusion of sulfur into the nanodiamond then takes place due to the stress-induced chemical reaction, which exhibits transformation from spa-bonded diamond into $sp_2$-bonded amorphous carbon and then eventually into graphitic layers in the form of OLCs, as shown by schematics in FIG. 2A (III-IV) and the corresponding TEM images in FIGS. 2D-2F. Interestingly, once disintegration of $MoS_2$ occurs, amorphization and graphitization proceed immediately.

Figure 2B:
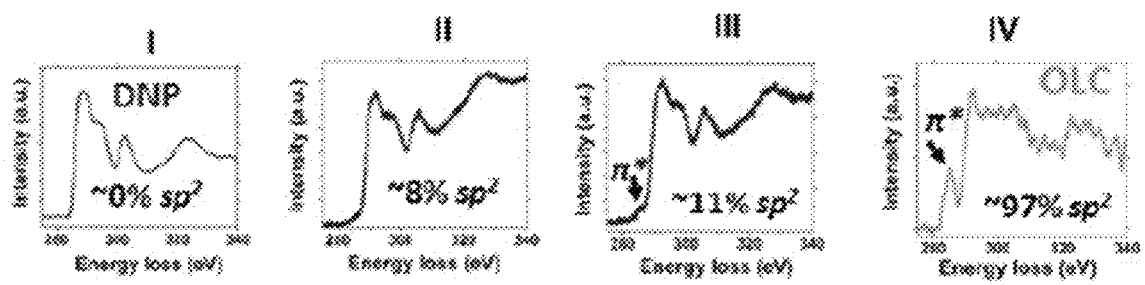
Figure 2C:
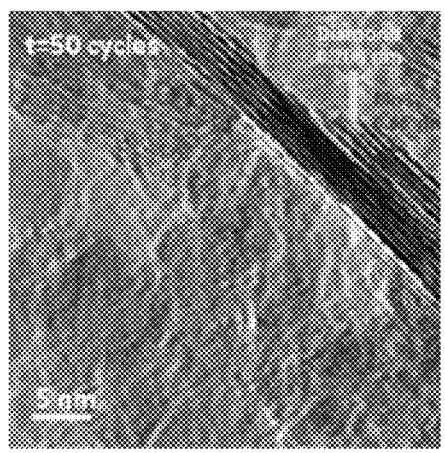
Figure 2D:
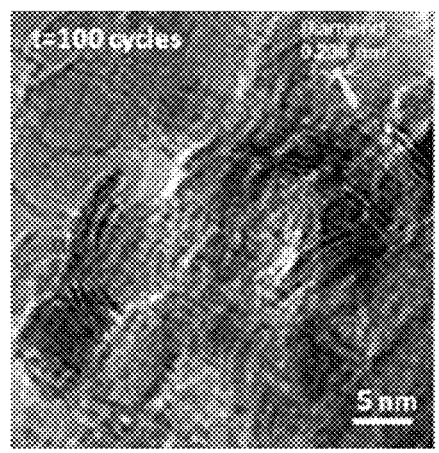
Figure 2E:
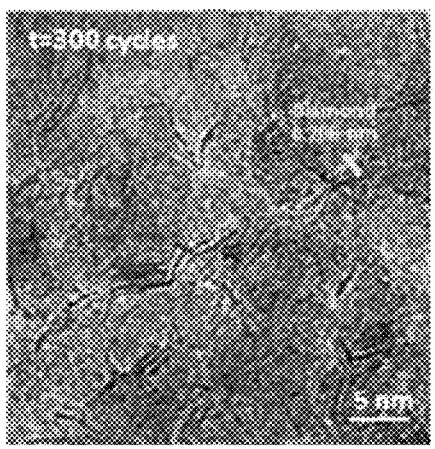

Electron energy loss spectra (EELS) confirm this systematic evolution in the structure of wear debris from nanodiamond (FIG. 2b(I-III)) into OLC (FIG. 2b(IV)), which agrees with the TEM images shown in FIGS. 2C-2F. Initially, due to the spa-bonded nature of the carbon in the detonated nanodiamonds, EELS spectra indicate almost no presence of the π* peak (at ~285 eV) in the carbon K-edge spectra. After conversion of nanodiamond into OLC structures, we observed a $sp_2$-bonded carbon π* peak. The corresponding $sp_2$ fraction for every stage of transformation was calculated based on the position and intensity of the π* peak. Though H-DLC may potentially be the source of carbon as well as for sulfur to react, due to its hydrogenated nature (passivated with hydrogen), this element tends to react with oxygenated nanodiamond of higher surface-to-volume ratio. This enables fast conversion of the tribofilm into OLC structures, leading to superlubricity. The interaction of $MoS_2$ edge atoms with the dangling bonds on the nanodiamond surface may also be helping to form a scroll around the nanodiamond, as previously observed with a graphene-forming scroll around nanodiamond. Once the nanodiamonds are fully converted into carbon nano-onions, they slide against the H-DLC surface, thus reducing the contact area and with minimal mechanical energy dissipation due to the incommensurate sliding interface between them resulting in a dramatic decrease in friction.

Figure 2F:
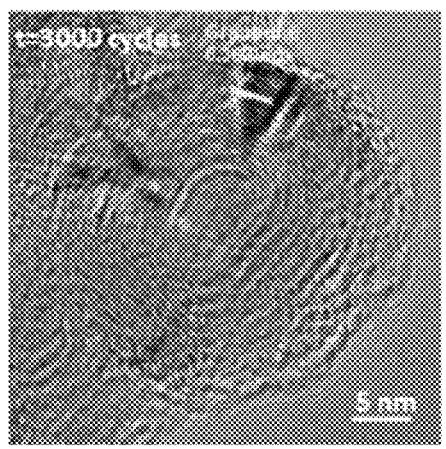
Figure 4A:
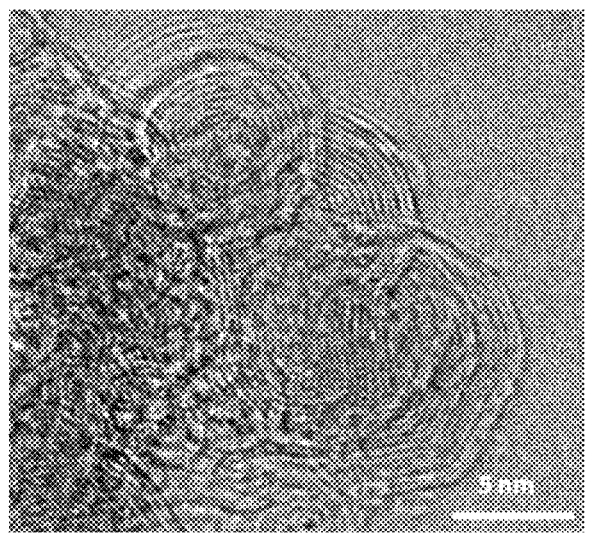
FIG. 4A shows a TEM image demonstrating the structure and the size of the OLCs deposited on the surface.

Interestingly, dispersing the surface with only $MoS_2$ flakes without the nanodiamond did not result in superlubricity. The bare $MoS_2$ showed at least 10 times higher friction (COF: 0.05±0.01) with high wear on the H-DLC ball side. We also tried dispersing commercially available small diameter (5-7 nm) OLCs directly at the interface in bare form or in combination with $MoS_2$, but the OLCs did not demonstrate superlubricity in either case (FIGS. 4A-4E). We attribute the high friction with these OLCs to their being only a few layers thick (5-7 layers), as shown in FIG. 4A, as compared to the in-situ produced multilayers (15-20 layers) of OLCs in the previous case (FIG. 2F). We believe that at such low layer thickness, the overall stiffness of the OLC is not high enough to withstand high contact pressures and shear stresses at the interface. As a result, they buckle during sliding, increasing the contact areas and hence displaying relatively higher friction. By contrast, the multilayered OLCs survive high contact pressure due to their higher stiffness. On the basis of molecular dynamics (MD) simulations, we explain this subtle relationship in the stiffness with respect to the number of graphitic layers in later part of this manuscript.

Figures 3A, 3B:
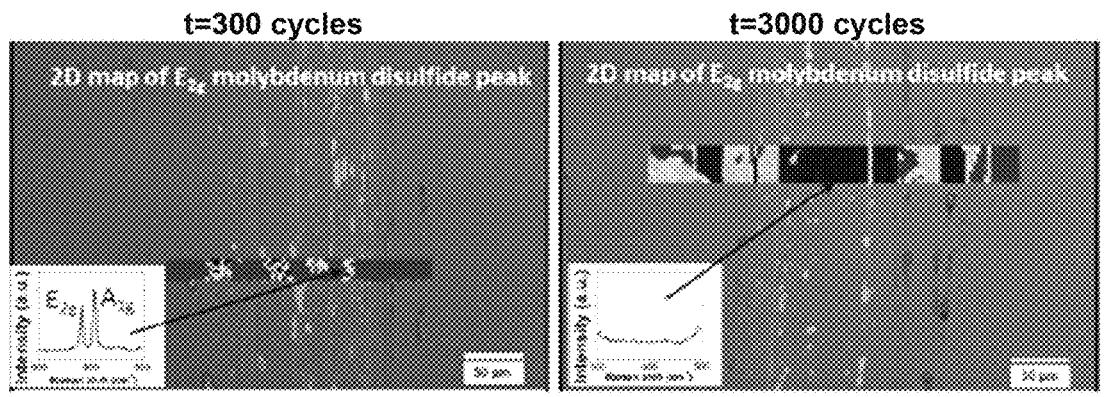
FIGS. 3A-3D show Raman 2D mapping of the wear track for the characteristic E2g peak (at ~383 cm-1) of molybdenum disulfide and characteristic G peak (at ~1600 cm-1) of carbon layered structures after initial 300 cycles (a and c) and 3000 cycles (b and d). Insets demonstrate typical $MoS_2$ (FIGS. 3A and 3B) and graphitic carbon (FIGS. 3C and 3D) signatures inside the wear track.
Figures 3C, 3D:
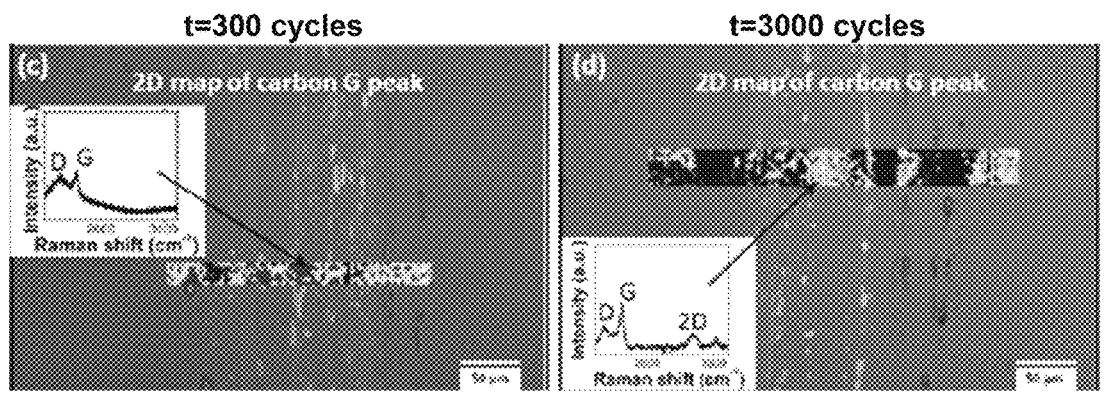

To gain further insight into the evolution of the carbon-based tribolayer within the wear track and identify the chemical state of the $MoS_2$, we have carried out Raman spectroscopy studies and time-of-flight laser desorption single photon ionization (LDSPI) analysis of the wear track. The LDSPI analysis is a very sensitive technique, detecting elemental compositions down to the ppb level without the risk of modifying the surface (such as alloying) as it employs gentle laser desorption as opposed to the ion-beam induced sputtering used traditionally with time-of-flight secondary ion mass spectroscopy (ToF-SIMS). More details about this technique and specific advantages are mentioned elsewhere. As shown in FIGS. 3A and 3C, the Raman 2D mapping of the characteristic $E_{2g}$ peak for $MoS_2$ (at ~383 $cm_{-1}$) and the G peak for carbon structures (at ~1600 cm-1) after initial 300 wear cycles indicates uniform distributions of carbon and $MoS_2$ patches inside the wear track similar to the ones on the unworn surface outside the wear track. However, after 3000 cycles, when TEM analysis shows no traces of $MoS_2$ in the form of two-dimensional layers, Raman mapping of the $E_{2g}$ characteristic $MoS_2$ peak shows no $MoS_2$ in the center of the wear track, and Raman mapping shows increased intensity of the carbon G peak at the center of the wear track compared to that of the unworn surface (FIGS. 3B and 3D). This higher G peak indicates formation of $sp_2$-bonded carbon in the wear track, as one would expect from the graphitization of the $sp_3$-dominated nanodiamond structure.

Figures 3E, 3F, 3G:
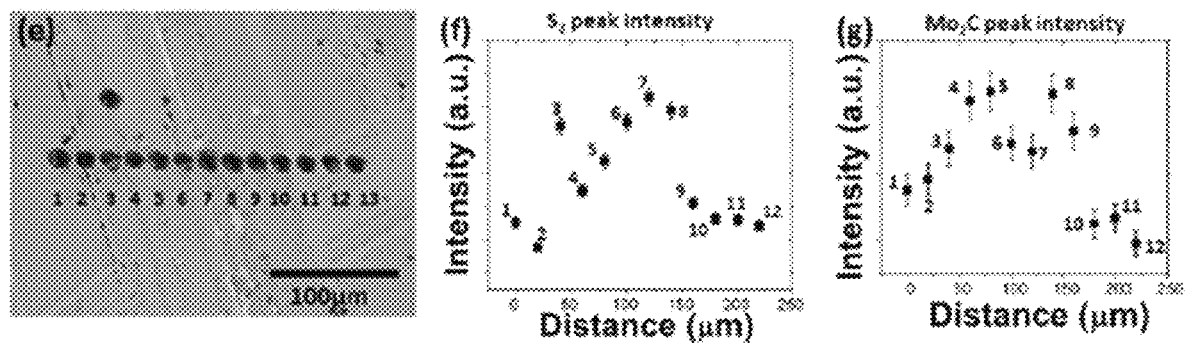
FIG. 3E shows twelve points across the wear track for which LDSPI analysis performed.
In FIG. 3F, an increase in intensity shows molecular sulfur S2 peaking at 64 atomic mass units.
FIG. 3G shows molybdenum carbide Mo2C peaking at 204 atomic mass units, indicating transformation of molybdenum and sulfur after disintegration of molybdenum disulfide. The samples were analyzed immediately after the test without cleaning.

The LDSPI analysis was performed at 12 points across the wear track (see the optical micrograph in FIG. 3E). The resulting data further support the observation that $MoS_2$ disintegrates during the sliding test, possibly under high shear and high mechanical stress conditions, as a consequence of subtle changes in the molybdenum, sulfur, and carbon compositions (FIGS. 3E-3G). No sulfur atom signal (at 32 amu) was detected across the wear track, whereas a signal at mass 64 amu, attributable to the sulfur molecule $S_2$, was clearly observed. This result is not surprising because of the high ionization potential and low ionization probability of S in comparison with $S_2$. FIGS. 3F and 3G illustrate the variation of the $S_2$ peak and molybdenum carbide ($Mo_2C$) signals, respectively, when analysis spots are rastered point-by-point across the wear track. The $S_2$ and $Mo_2C$ signals increase inside the wear track in comparison with the outside area, suggesting the formation of free sulfur (presumably in the form of $S_2$) and molybdenum carbide molecules during the wear test. Note that although with LDSPI we see increased $S_2$ and $Mo_2C$ signals within the wear track, it is quite insignificant at the TEM scale (unless we use aberration-corrected high resolution TEM). The Raman together with LDSPI data bring out the key features of the chemical evolution of the tribolayer taking place and strengthen our argument regarding the mechanism of OLC formation within the wear track.

It is important to mention that the proposed tribocatalytic model of OLC formation at the tribological interface distinctively differs from that of our earlier mechanism of graphene scroll formation around nanodiamond, where we did not observe any catalytic effect because the whole tribosystem involved only carbon materials without any catalytic agent. The initial formation of the tribolayer in the present case brings a different perspective on the macroscale superlubricity mechanism but still hinges on the concept of nanoscroll formation.

To better understand the tribocatalytic mechanism that leads to such a dramatic friction reduction, we performed large-scale reactive molecular dynamics (RMD) simulations. Vasu et al. reported that Van der Waals forces create high contact pressure on the order of gigapascals on the molecules trapped between 2D layers. Meanwhile, Ashby et al. showed that during dry sliding, the local contact heating events may result in a temperature increase up to 1773 K. Thus, with the experimental conditions used in our experiments, it is quite reasonable to assume that once $MoS_2$ wraps around nanodiamond clusters, the high contact pressure (1-2 GPa) and strong Van der Waals forces acting on these trapped nanodiamonds might act as a nanoscale reaction chamber that could result in diffusion of sulfur into the nanodiamond through slow disintegration of $MoS_2$ into its constituent elements (i.e., Mo and S), which can then interact with the nanodiamond in the wear track.

Figure 4B:
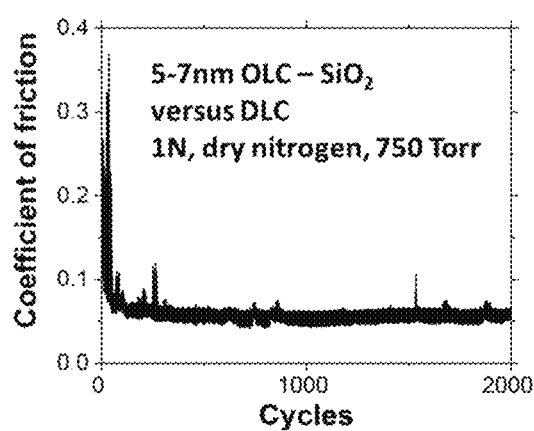
FIG. 4B shows the COF for 5-7 nm OLC on silicon dioxide substrate sliding against DLC ball in dry nitrogen indicating high frictional values: 0.06±0.012.

To gain insights into the interaction of Mo and S atoms with nanodiamonds, we performed RMD simulations. The results indeed suggest that both S and Mo induce structural degradation of the nanodiamonds: S induces rapid amorphization of the diamond lattice as shown in the snapshots in FIG. 4a, whereas Mo reacts locally with the neighboring C (Mo reacts with C atoms on the surface of diamond particle forming carbide, and induces amorphization at the surface) to form molybdenum carbide (as also confirmed experimentally), which is thermodynamically the more stable phase at the high temperature (>900 K). In the case of S, the large steric size of the S impurity causes strong S-S interaction, which is mediated by the distortion of the diamond lattice up to the next nearest-neighbor lattice sites. Our simulations at varying S content of 1-15% suggest that amorphization occurs at the percolation threshold of the S-S network with the next nearest-neighbor connectivity (~10% S concentration at the surface). For example, the snapshots in FIG. 4A follow the structural change in the diamond lattice for 15% S concentration. The larger S atoms result in large localized strains (near the impurity site), which propagate through the diamond lattice and cause significant lattice distortion and disordering. The structural disorder manifests itself as a broadening of nearest neighbor peaks, as well as progressive disappearance of higher order peaks in the C-C pair radial distribution functions (RDF) (FIG. 4A inset). The final structure is thus highly disordered, comparable to that of amorphous carbon. We further tracked the structural evolution of an amorphous carbon sphere starting at ~1000 K and cooled down to 300 K over a period of 2 ns. The snapshots obtained from the cooling trajectories reveal a crystallization process that leads to a structural transformation from the initial disordered amorphous carbon to a more ordered structure (FIG. 4B). The corresponding C-C RDFs reveal a prominent shoulder appearing at ~2.85 Å during the crystallization stage, the intensity of which increases progressively with time. This peak corresponds to intra-hexagon spacing, which suggests the formation of a more compact, homogeneous, and less defective structure with graphitic order. Analysis of the crystallized structure reveals an onion-like texture, which consists of numerous graphitic hollow spheres arranged concentrically in a layer-by-layer manner as confirmed experimentally by our TEM observations. The formation of these OLC structures has interesting ramifications for subsequent tribological processes.

To further elaborate the importance of the nanodiamond+ $MoS_2$ combination for successful OLC formation and thus near-zero COF, we performed a test for pure $MoS_2$ sliding against the DLC surface. In this case limitation of free carbon suppresses formation of OLC and results in the high COF.

Also, to demonstrate the uniqueness of forming large OLC structures for demonstrating ultra-low friction, we have performed a tribo-test with small 5-7 nm OLCs (FIG. 4A). The tests for bare small OLC (FIGS. 4B and 4C) as well as for small OLCs combined with molybdenum disulfide (FIGS. 4D and 4E) revealed comparably low friction, although not in the superlubricity regime. These results demonstrate the necessity for forming larger structures in-situ to promote near zero friction. As demonstrated by MD simulations, the large OLC structures show higher stability. Mixing small OLC with $MoS_2$ is also not efficient for forming large stable onions due to limitations of available carbon source, or for forming $MoS_2$ scrolls due to the absence of dangling bonds in OLC to initiate the scrolling. Also, for the case of manually supplied OLC, the produced wear of the H-DLC ball is also larger than the wear for the superlubricity case described in the main manuscript.

Figure 4C:
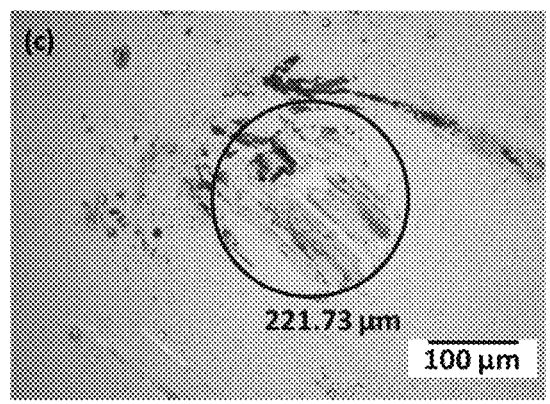
FIG. 4C shows the wear of the ball side after the tribo-test indicates a wear volume of 1.48±0.28×10−5 mm3.
Figure 4D:
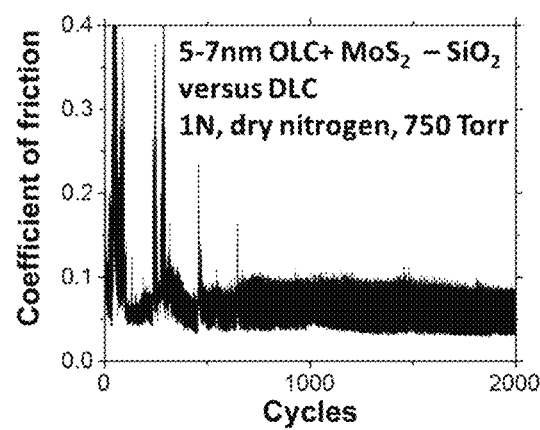
FIG. 4D shows the COF for 5-7 nm OLC combined with molybdenum disulfide flakes on silicon dioxide substrate sliding against DLC ball in dry nitrogen indicating high frictional values: 0.05±0.02.
Figure 4E:
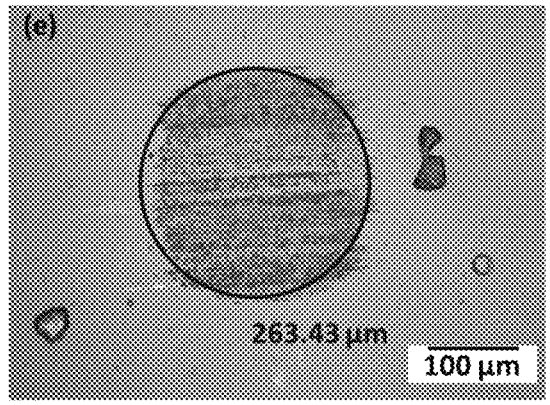
FIG. 4E shows the wear of the ball side after the tribo-test indicates wear volume of 2.96±0.47×10−5 mm3.

To elucidate the load-bearing properties of the shell structures, we characterized their response to compressive uniaxial stress through MD simulations (FIG. 4C). Here we should highlight that the initial high stiffness of the $MoS_2$ layers allows for encapsulation of large clusters of nanodiamonds into $MoS_2$ shells. Such shells play the role of a template for the formation of OLC structures of large size. The experimental results indicate that the typical diameter of the scrolled structures is in the range of 20-30 nm (and up to 40 layers). The MD results in FIG. 4C show the structural evolution as well as maximum load bearing before fracture for shell structures containing 3, 4, 5, and 7 layers. The dimensional reduction along the compression direction is accompanied by significant volume expansion along the axial directions.

We quantified the maximum sustainable load (MSL) for a given number of layers in a carbon onion (FIG. 4C). With increasing number of layers, the MSL is also expected to increase (e.g., a linear extrapolation estimates MSL for 40-layer onion to be ~3.5 μN) which is experimentally shown to be capable of supporting significantly higher loads without failure. Our simulations and experiments suggest that a stable superlubricity regime is possible with OLC diameters in the range of 20-30 nm. The capability of layered structures to carry high loads and provide low friction has been previously shown for sputtered $MoS_2$ films.

The picture that emerges from our experimental and theoretical investigations is that, after initial encapsulation of nanodiamond clusters by 2D $MoS_2$ layers, these encapsulated structures behave like nano-enclosures or nano-scale reaction chambers. The diffusion of sulfur into nanodiamond possibly takes place via interactions of sulfur with the oxygenated surface of the nanodiamond and mechanical stress-induced reaction, which eventually disintegrates $MoS_2$ into atomic molybdenum and sulfur. Following this, the catalytic activity of sulfur with nanodiamond induces graphitization of spa-bonded carbon all the way to the core of the cluster (FIG. 4A) and initiates formation of concentric OLC structures (FIG. 4B). As suggested by Xie et al., sulfur plays an important role in graphene formation starting from dehydrogenation of the outer shell of the diamond nanoparticles and followed by formation of bridging monosulfide linkages, which are further rearranged into the graphene lattice. Molybdenum also amorphizes nanodiamonds; however, the graphitization rates are lower than those for sulfur, and during the metal-induced catalytic graphitization, the molybdenum forms stable molybdenum carbide compounds (FIG. 3G), which preclude onion formation. The in-situ formation of OLCs reduces the effective contact area and provides an incommensurate surface against randomly oriented DLC, thus reducing the friction coefficient to the superlubric regime by a similar mechanism as for graphene scrolls.

FIG. 5A shows atomic snapshots at selected times during the sulfur-induced amorphization of a diamond nanoparticle. FIG. 5B shows atomic snapshots at selected times during the formation of OLC structures from amorphous carbon. Insets in FIG. 5A and FIG. 5B indicate the radial distribution functions for each step highlighted and the corresponding TEM image of the resulting structure. The scale bar in TEM images is 5 nm. FIG. 5C shows simulation results showing dependence of fracture loads on number of layers in the carbon onions, indicating increased load-bearing stability of OLC with increase in OLC layers.

To summarize, we have discovered a new macroscale superlubricity mechanism when 2D molybdenum disulfide coupled with nanodiamonds is used in tribological tests. Though the initial testing stage confirms the tendency for $MoS_2$ to wrap around nanodiamonds to form scroll-like structures, the continuous sliding in the presence of molybdenum and sulfur catalytic activity results in pressure- and shear-induced transformation of nanodiamond clusters into in-situ formation of $sp_2$ bonded graphitic layers arranged into OLC structures, which are capable of providing the superlubricity regime for extended time periods when sliding against an amorphous H-DLC surface.

Methods.

Preparation of Materials.

Solution-processed molybdenum disulfide was prepared by chemical exfoliation of bulk $MoS_2$ crystal and was then suspended in ethanol with 18 mg/L graphene. The resulting solution contained 1 to 8 monolayers thick $MoS_2$ flakes. Next, we added diamond nanoparticles (nanodiamonds) of 3-5 nm diameter (FIGS. 8A-8B) into the solution in the proportion of 50-1000 mg of nanodiamonds per liter of solution. The resulting solution after 20 minutes of sonication was deposited in a small amount (10-20 drops or 0.5-1 mL of solution per 10 $cm_2$) on the $SiO_2$ substrate in a colloidal liquid state, and the liquid ethanol was evaporated in dry nitrogen. This procedure resulted in few-layer-thick $MoS_2$ flakes (~75% of the surface coverage with the estimated flakes size of 0.2-0.5 μm) and nanodiamonds non-uniformly covering the substrate. The expected number density of nanodiamonds per unit area of the substrate is in the range of $10^{11}$-$10^{13}$ particles/$cm_2$, depending on the size of the nanodiamonds (3-5 nm).

In the ball-on-disk tests described below, the counterpart was a stainless steel ball (440C grade) of 9.5-mm diameter covered with a 1-μm-thick hydrogenated diamond-like carbon (H-DLC) layer of root mean square roughness $R_q$=20 nm. The DLC film was deposited by plasma-enhanced chemical vapor deposition at room temperature.

Tribological Tests

Tribological tests were performed in dry nitrogen (900 mbar) and humid air (30% relative humidity) at room temperature using a CSM ball-on-disk macroscale tribometer. The normal load during the tribotests was kept at 1 N (Hertz contact pressure of 0.2 GPa), and the angular velocity was 60 rpm (0.6-9 cm/s where the radius of the wear track varied from 1 mm up to 15 mm). Zero calibration of the machine was performed automatically at the beginning of each test. All the tests were repeated at least five times to confirm reproducibility of the results.

The wear volume of the flat was very difficult to assess, as wear was manifested as deep scratches and could not be fit into a reliable wear equation. To estimate the wear volume for the balls after the tribotests, we used the following equation:

$$V = \left(\frac{\pi h}{6}\right)\left(\frac{3d^2}{4} + h^2\right)$$

where:

$$h = r - \sqrt{r^2 - \frac{d^2}{4}}$$

d is wear scar diameter, and r is the radius of the ball.

Characterization Techniques.

The wear scars were imaged with an Olympus UC30 microscope and characterized by an Invia Confocal Raman microscope using the red laser light ($\lambda$=514 nm). The wear debris formed during the tribotests was imaged with a JEOL JEM-2100F transmission electron microscope, for which samples were picked up from the wear track with a probe and transferred to a copper grid. Laser desorption analysis was performed with a home-built, time-of-flight mass spectroscopy SARISA (surface analysis by resonant ionization of sputtered atoms) instrument.

Laser desorption single photon ionization analysis was performed with a laser post-ionization secondary neutral mass spectrometry instrument operated in the laser desorption mode using the second harmonic of Ti:sapphire (370 nm wavelength, 14 ns pulse duration). The desorption laser pulses were focused onto the front side of the target, with the use of an instrument-embedded microscope, into a spot of about 7-micron diameter. An $F_2$ laser (GAM 100EXF, $\lambda$=157 nm, 10 ns pulse duration, 2 mJ/pulse energy) was used to photoionize the desorbed species in the plume with the delay of 2000 ns against the desorption laser pulse. Ionized atoms and molecules were collected by front optics and analyzed by a time-of-flight mass spectrometer. The instrument was operated with 200 Hz repetition rate. The target was positioned on the in-situ nano-motion stage, and the analysis was performed at several points by moving the target across the desorption laser beam in increments of 20 µm. Each mass spectrum was the sum of 1024 laser shots acquired by a fast digitizer.

Molecular Dynamics Simulation

The interactions between C, Mo, and S atoms were determined by using a reactive force field (ReaxFF) based on bond order formalism. The ReaxFF parameters employed were taken from Mattsson et al. ReaxFF provides a continuous treatment of formation/dissociation of bonds and dynamic charge transfer between atoms, and thereby, it describes chemical reaction pathways accurately. To understand the impact of S and Mo atoms on the structure of diamond nanoparticles, we input that the surface of the nanodiamond was doped with Mo/S atoms at random locations (concentration ranging from 1% to 15%). We employed nanodiamonds ~3 nm in diameter (7200 C atoms) for all the simulations. All the atoms were imparted with velocities of Maxwell distribution, such that their kinetic energy was consistent with 1000 K; structural evolution of the nanodiamond was then monitored in microcanonical RMD simulations with a time step of 0.25 fs in LAMMPS. To simulate the size effect on the load-bearing properties of the onion shell structures, we generated onion structures with 3, 4, 5, and 7 layers and studied their response to compressive uniaxial load (up to micro-newton range) through MD simulations. The fracture load was identified by the sudden discontinuity or drop in the load vs. displacement curve.

h-BN Tribocatalytic Material.

Figure 6A:
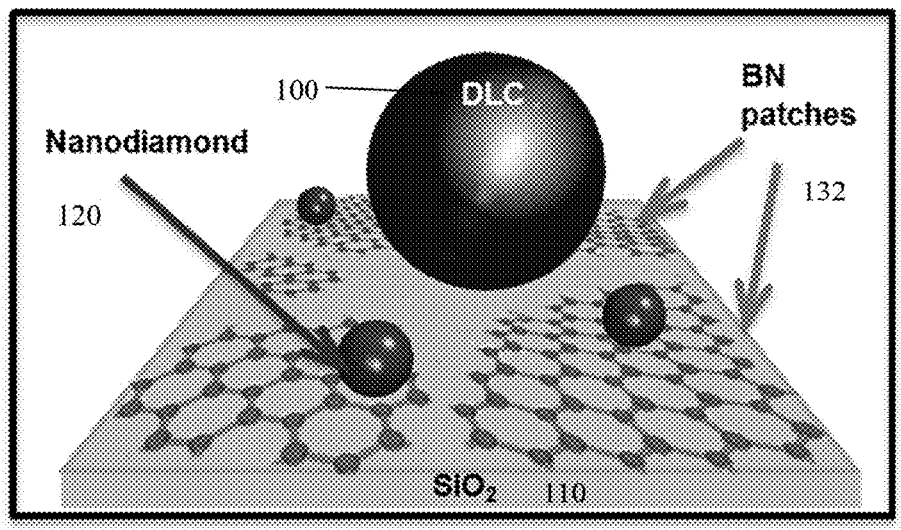
FIG. 6A is a schematic depiction of a wear resistance and coefficient of friction testing arrangement in one embodiment.
Figure 6B:
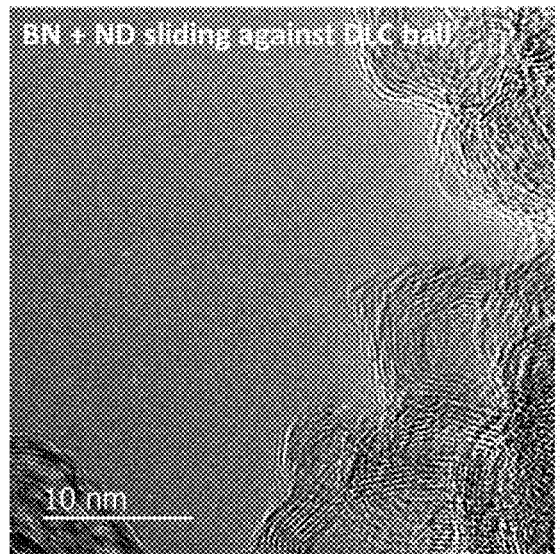
FIGS. 6B-6C are TEM images of the wear debris formed after achieving the superlubricity regimes both for boron nitride with nanodiamond and just for boron nitride sliding against DLC coated ball.
Figure 6C:
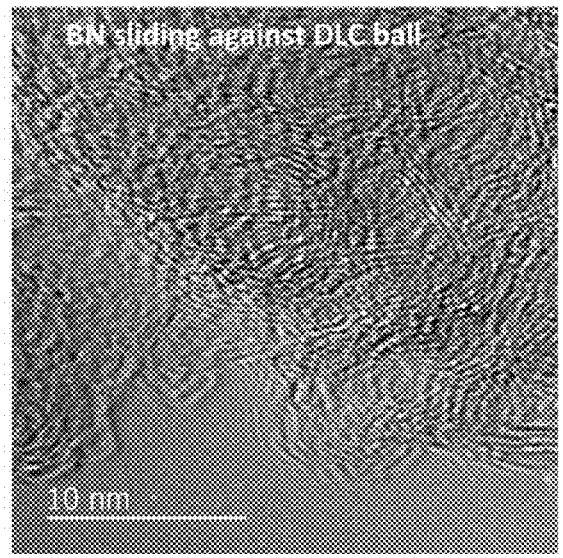

In case of h-BN, it has been demonstrated that superlubricity is achieved both with and without nanodiamonds, though the wear of the DLC side is larger in case of no nanodiamonds involved. Thus, the presence of nanodiamonds provides for improved properties in a superlubric regime. The friction behavior is similar to the previously observed superlubricity with graphene films. In one embodiment, the material comprises hexagonal boron nitride (h-HN). The superlubric state was achieved for both of the cases when boron nitride flakes/platelets were used with and without nanoparticles. FIGS. 6A-6C demonstrate the COF and wear results for both cases indicating that in case of h-BN without nanodiamond particles, the wear of the ball side (DLC coated) is much more pronounced. This difference is attributed to the fact that DLC in this case acts as carbon supply through catalytic process in growing carbon nano-onions on BN scrolled template.

Figure 7:
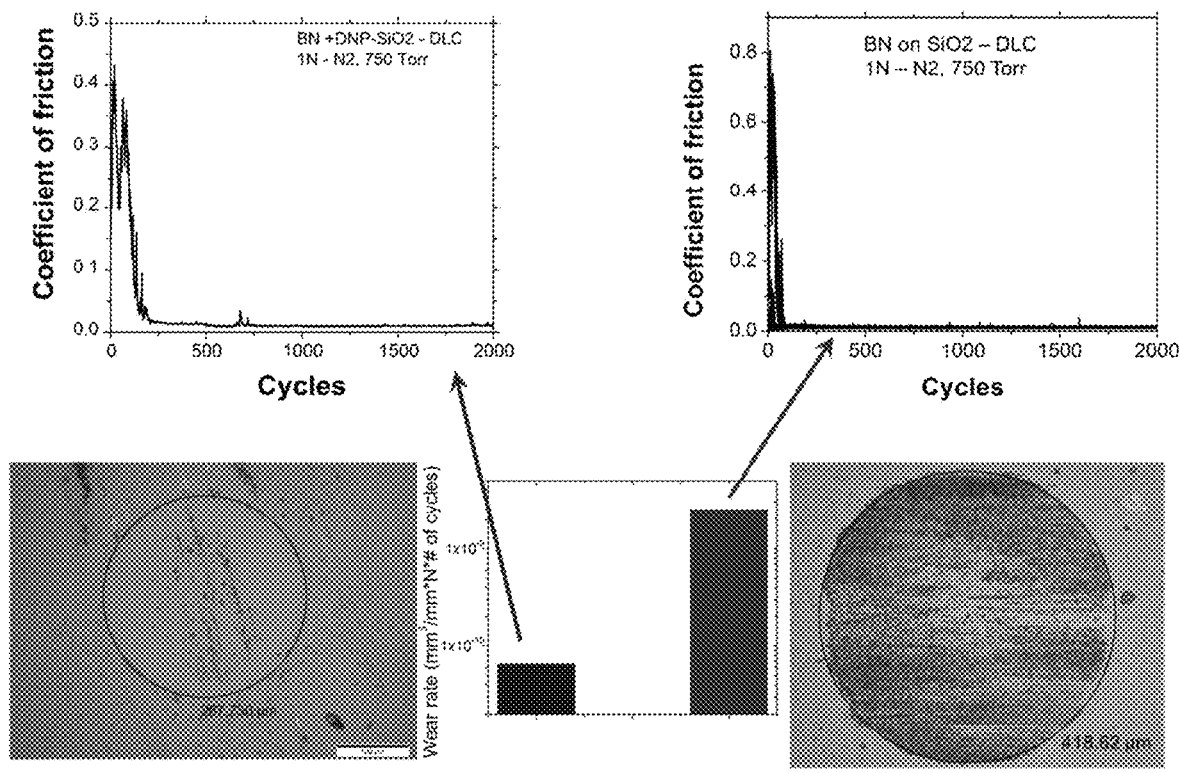
FIG. 7 shows the coefficient of friction and wear for boron nitride with and without nanodiamonds sliding against DLC coated ball.

TEM analysis (FIG. 7) of the wear debris for both of the cases indicates formation of the scrolls in the wear track during sliding with amorphous carbon core inside. Thus, in certain embodiments the scrolls have an amorphous core. It is believed that the observed properties are in part due to the layers of the scroll not bonding strongly to the core. If the core is amorphous, layers can slide and that is crucial for superlubricity. For example superlubricity is not observed if the nanodiamond is graphitized. In that case, few layers of graphene are still strongly attached to the nanodiamond core inside and therefore the effect of "ball-bearing" is vanished. In case of nanodiamonds used in the tests, nanodiamond itself plays the role of carbon source. Whereas, in the case of bare h-BN platelets sliding against DLC, DLC plays the role of carbon source, thus requiring longer initial run-in period and higher wear of the ball side.

In one embodiment, the process involves drop casting. The process provides for a total coverage of between 25 and 75 percent. Notably, the ratio of nanodiamond to 2D material is maintained. The desired range of nanodiamond to 2D material ratio is 50:1 to 1000:1.

Other embodiments are directed to superlubricity achieved using graphene with other than diamond nanoparticles, such as catalytic metal nanoparticles. Superlubricity has now been observed when other than diamond materials are used as a nanoparticle core.

Graphene and Tribocatalytic Nanoparticles.

In one embodiment, the nanoparticles comprise a material reactive with carbon. For example, the nanoparticles may comprise nickel, iron, iron (III) oxide ($Fe_2O_3$), platinum, platinum group metals, cobalt, and $Si_3N_4$. Further, the nanoparticles may comprise more than one element or material, such as an alloy or in a core/shell configuration such as cobalt with a molybdenum shell. The nanoparticles may be a transition metal, insulating (such as Si3N4, nanodiamond or oxide nanoparticle). The average grain size is 3-100 nm.

In one embodiment the system utilizes a dry inert environment, as described above. Specifically, the environment is nonreactive with the nanoparticle material, such as a dry nitrogen environment or an argon environment.

As demonstrated by the evolution of the wear debris material through TEM images (FIGS. 12A-12D), it is believed that the mechanism involves the following steps:

During the sliding process, graphene wraps around nanoparticles or interacts with nanoparticle causing catalytic reaction with the metal nanoparticles. The DLC is a hydrogenated DLC and serves as the counter surface against which the lubricant material (graphene and nanoparticles and its by-product such as carbon nano-onions) interact.

Due to the catalytic activity of iron with carbon, diffusion of carbon into the iron nanoparticles results in the formation of amorphous carbon and the reduction in the size of nanoparticle. In one embodiment, the environment is an inert environment and the diffusion occurs upon pressure (and elevated temperature) during the sliding process.

Due to the high contact pressure and enhanced diffusion of carbon in iron, transformation of amorphous carbon into onion-like carbon structures and complete consumption of iron nanoparticle is observed. It is believed that superlubricity occurs upon onion formation in the wear track, typically 20-30 wear cycles.

Figure 12A:
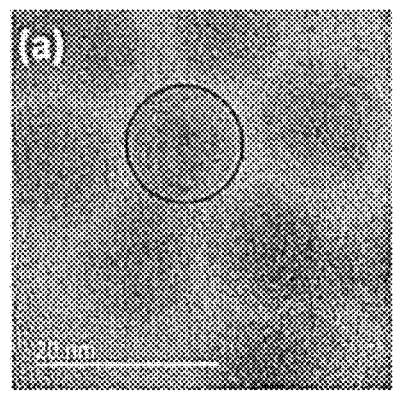
FIG. 12A shows TEM evolution of graphene+DLC+iron nanoparticle structures collected from the wear track when the superlubricity regime is achieved.
Figure 12B:
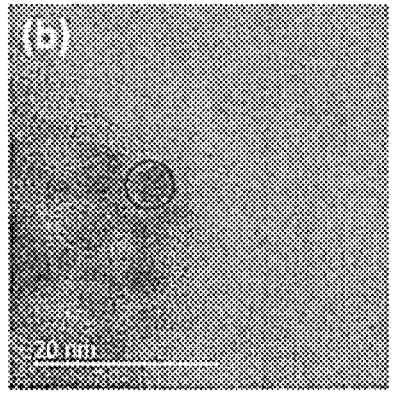
FIG. 12B indicates that almost immediate degradation of iron is observed.
Figure 12C:
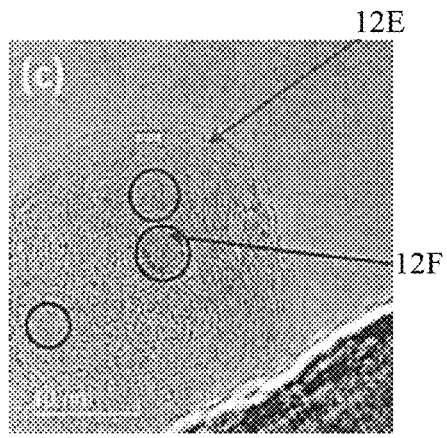
FIG. 12C shows eventual growth of onion-like carbon structures.
Figure 12D:
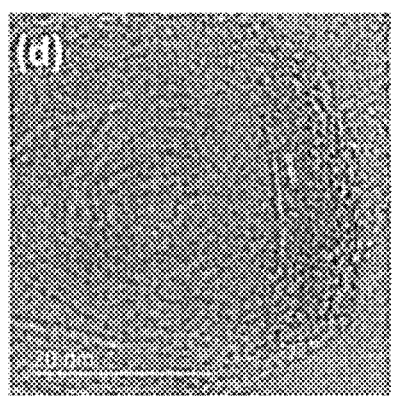
FIG. 12D shows that complete degradation of iron follows.
Figure 12E:
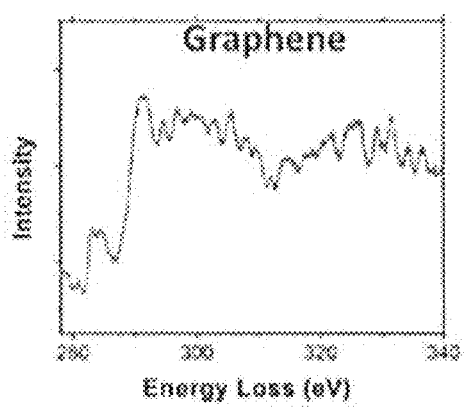
FIGS. 12E and 12F represent EELS spectra for graphene and iron correspondingly.
Figure 12F:
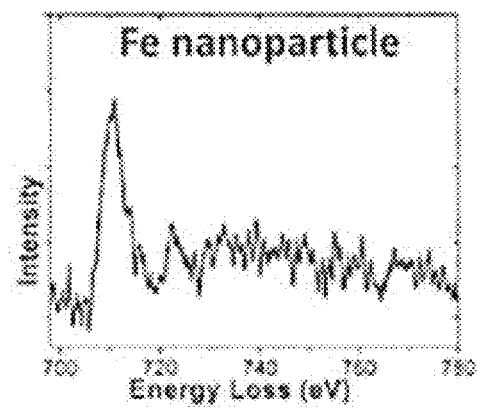
Figure 13A:
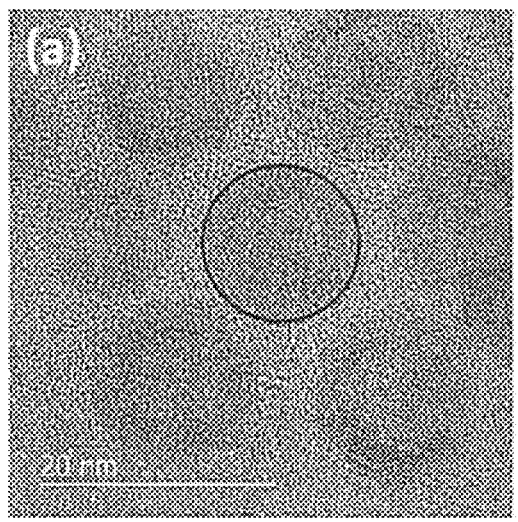
FIGS. 13A-13B show TEM evolution of graphene+DLC+iron oxide nanoparticle structures collected from the wear track. It is important to note that in contrast to non-oxidized iron nanoparticles, in case of $Fe_2O_3$ nanoparticles no material degradation is observed.
Figure 13B:
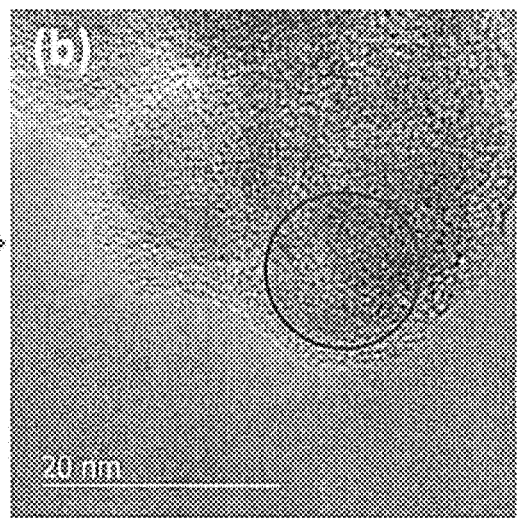
Figure 14A:
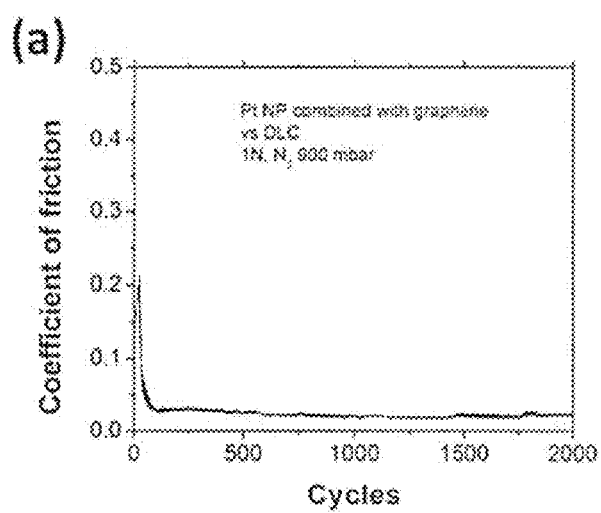
FIGS. 14A-14F show the coefficients of friction and corresponding TEM images of the wear debris formed during the tribo-tests for graphene coupled with platinum, cobalt, and molybdenum nanoparticles sliding against DLC ball in a dry nitrogen environment.
Figure 14B:
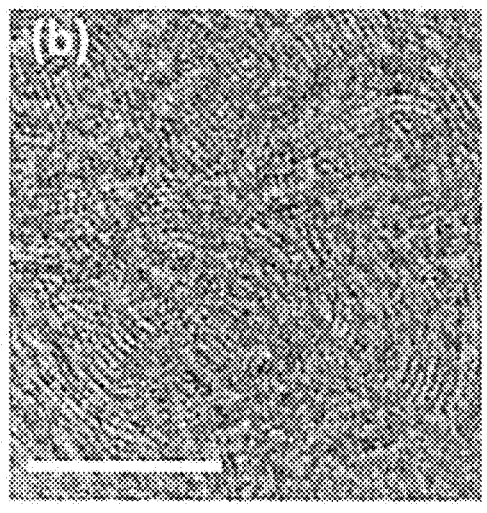
Figure 14C:
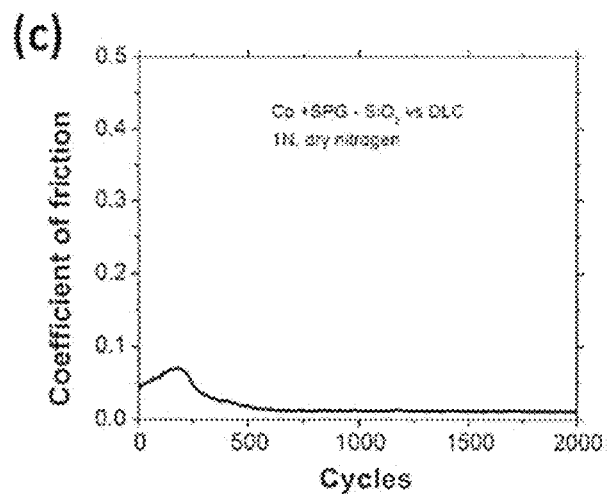
Figure 14D:
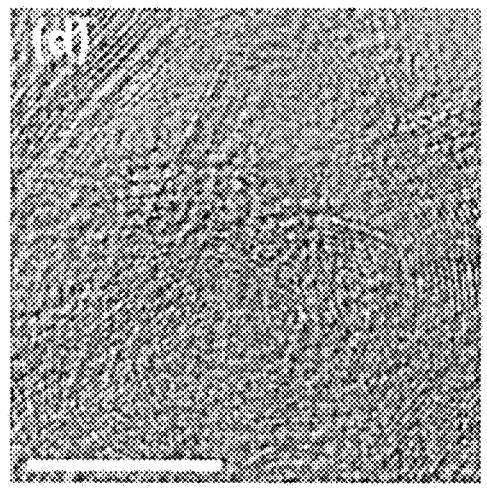
Figure 14E:
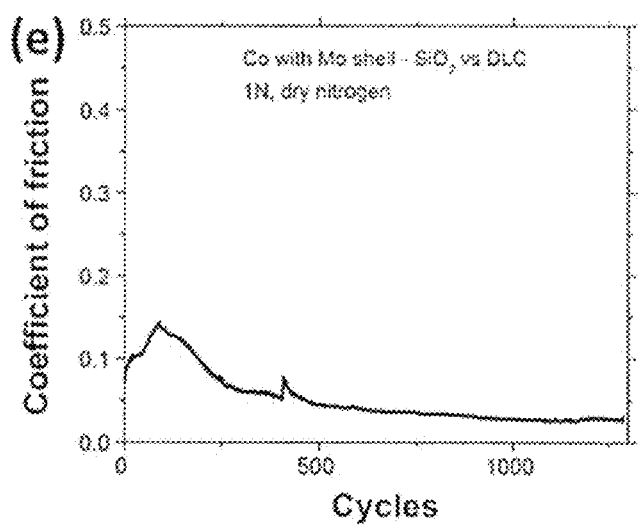
Figure 14F:
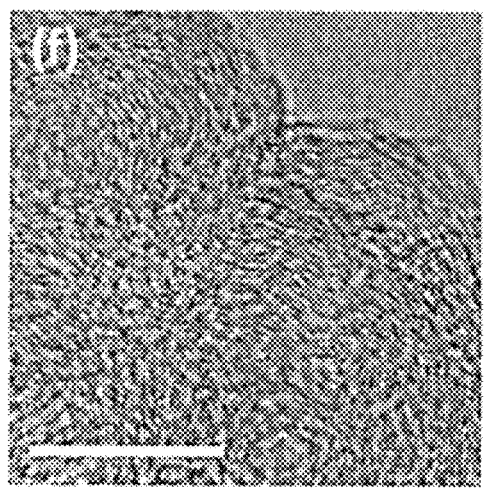

The carbon diffusion process in iron is hindered by the presence of a noncatalytic barrier, for example oxidation of the outer shell when iron oxide nanoparticles were used (FIGS. 13A-13B) and the catalytic effect of iron is thus much suppressed. Moreover, the presence of graphene flakes on the surface in contact with iron oxide promotes further disintegration of graphene to interaction with oxygen. In addition, the oxygen layer on the Fe nanoparticle acts as a barrier layer which does not allow diffusion of carbon into Fe, resulting in no catalytic activity to produce carbon nano-onions. The presence of an iron oxide shell results in high wear of DLC surface with no superlubcirity. EELS spectra (FIGS. 12E and 12F) confirm formation of graphitic layers in the wear debris. In case of iron oxide nanoparticles, when the shell of the nanoparticle is oxidized, such a degradation of the nanoparticle, accompanying the scrolled like carbon onion formation, is not observed.

Figure 11:
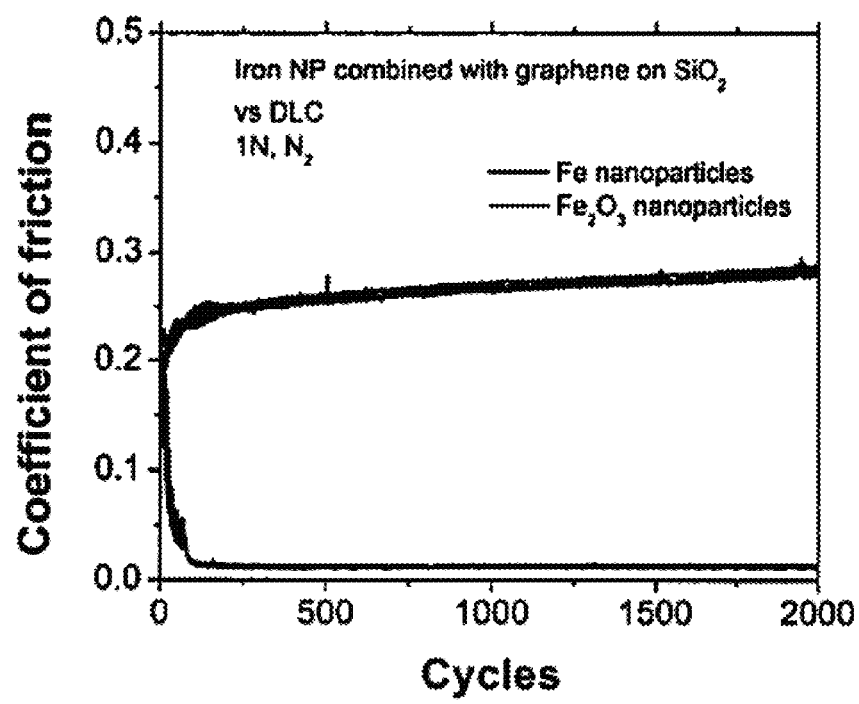
FIG. 11 shows COF for the iron and iron oxide nanoparticles coupled with graphene flakes and sliding against DLC surface.

In particular embodiments described below using iron nanoparticles, superlubricity was observed similar to what we have observed before using diamond nanoparticles (FIG. 10) although with a different mechanism. However, the superlubricity was lost when iron nanoparticles were oxidized. The oxidized shell of nanoparticles results in failure of the superlubricity mechanism and high friction behavior (FIG. 11). In all the following cases the size of nanoparticles was in the range of 8-10 nm, and the other participating materials (graphene sheets, silicon dioxide substrate, and the DLC ball) were kept the same as shown to be successful for working superlubricity mechanisms described above.

To investigate the role of nanoparticle material on the carbon layered structure formation we review the diffusion barrier for different materials. Formation of similar layered carbon onion structures we have observed for other catalytic materials as well. FIGS. 14A-14F represent the summary of tested materials for nanoparticles indicating the success for achieving the superlubricity regime.

Table 1 below outlines all the performed experiments with different nanoparticles used and the average results for coefficient of friction values. The results confirm the active role of water intercalation and oxide presence to suppress the superlubricity regime.

| Nanoparticle Material | COF |
| --- | --- |
| Diamond Nanoparticle (DNP) | 0.004 |
| Ni | 0.004 |
| Fe | 0.009 |
| $Fe_2O_3$ | 0.25 |
| Pt (ethanol) | 0.017 |
| Pt (water) | 0.1 |
| Co (water) | 0.1 |
| Co (ethanol) | 0.008 |
| Cobalt with Molybdenum shell | 0.021 |
| $Si_3N_4$ (amorphous) | 0.016 |

The low friction surfaces and wear resistant surfaces disclosed herein may be included in any device where low friction or wear resistance is desired. For example, the low friction surfaces and wear resistant surfaces disclosed herein may be employed in devices including: bearings, molds, razor blades, wind turbines, gun barrels, gas compressors, fuel cells, artificial hip joints, artificial knee joints, magnetic storage disks, scratch-free monitors, scratch-resistant monitors, televisions, barcode scanners, solar panels, watches, mobile phones, computers and electrical connectors. For example, the low friction surfaces and wear resistant surfaces may be present on electrical connectors that are included in microelectromechanical systems (MEMS) or nanoelectromechanical systems (NEMS).

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. A method of forming a low friction wear surface comprising:
    disposing over a substrate a solution comprising nanodiamonds and a h-BN 2D material to form a first sliding component, the h-BN 2D material forming patches on the first sliding component;
    sliding the first sliding component against a second sliding component having a diamond-like carbon on a sliding surface;
    forming scrolls of the h-BN 2D material around an amorphous carbon core; and
    graphitizing the nanodiamonds, converting the scrolled nanodiamonds into nano-onions.

2. The method of claim 1, further comprising establishing a dry environment over the substrate.

3. The method of claim 1, wherein disposing the solution over the substrate comprises forming patches of the material on the substrate.

4. The method of claim 1, wherein forming patches of the material on the substrate comprises spraying a liquid containing the material onto the substrate.

5. The method of claim 1, wherein disposing the nanoparticles over the substrate comprises spraying a liquid containing the nanoparticles onto the substrate.

* * * * *